US008789131B2

(12) United States Patent  (10) Patent No.: US 8,789,131 B2
Choi et al.  (45) Date of Patent: Jul. 22, 2014

(54) ELECTRONIC DEVICE AND METHOD OF SHARING CONTENTS THEREOF WITH OTHER DEVICES

(75) Inventors: Haengkeol Choi, Seoul (KR); Woocheul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 13/090,178

(22) Filed: Apr. 19, 2011

(65) Prior Publication Data
US 2011/0283334 A1  Nov. 17, 2011

(30) Foreign Application Priority Data

May 14, 2010 (KR) .................. 10-2010-0045238
May 14, 2010 (KR) .................. 10-2010-0045239

(51) Int. Cl.
*H04N 7/16* (2011.01)
(52) U.S. Cl.
USPC ......................................... 725/148
(58) Field of Classification Search
USPC ......................................... 725/148
See application file for complete search history.

(56) References Cited

U.S. PATENT DOCUMENTS

| 8,132,217 | B2 * | 3/2012 | Miyata ............................ | 725/78 |
| 2006/0203758 | A1 | 9/2006 | Tee et al. | |
| 2006/0253874 | A1 * | 11/2006 | Stark et al. ...................... | 725/62 |
| 2008/0030304 | A1 | 2/2008 | Doan et al. | |
| 2009/0064021 | A1 * | 3/2009 | Boettcher et al. ............. | 715/766 |
| 2010/0082784 | A1 * | 4/2010 | Rosenblatt et al. ........... | 709/222 |
| 2010/0211655 | A1 * | 8/2010 | Jensen .......................... | 709/219 |
| 2011/0163939 | A1 * | 7/2011 | Tam et al. ...................... | 345/2.3 |

FOREIGN PATENT DOCUMENTS

| WO | 02/43359 | 5/2002 |
| WO | 2007063499 | 6/2007 |
| WO | 2008152531 | 12/2008 |
| WO | WO 2008152550 A2 * | 12/2008 |

OTHER PUBLICATIONS

Proxemic Interaction: Designing for a Proximity and Orientation-Aware Environment. Till Ballendat et al., ITS'10, Nov. 7-10, 2010, pp. 1-10.*

* cited by examiner

*Primary Examiner* — Nathan Flynn
*Assistant Examiner* — Alfonso Castro
(74) *Attorney, Agent, or Firm* — Lee, Hong, Degerman, Kang & Waimey

(57) ABSTRACT

An electronic device includes a wireless communication unit wirelessly communicating with any of a plurality of external devices which each comprise a display, a display displaying content including specific content, an input unit receiving an input for selecting the specific content, and a controller. The controller searches for an external device that is available for communication with the electronic device, establishes communication via the wireless communication unit with a selected first external device, which is one of the plurality of external devices identified as a result of the search for an external device, receives content specification information from the first external device to determine the first external device's capability to display the specific content, and causes displaying of the specific content on the display of the first external device upon determining that the first external device is capable of displaying the specific content based on the content specification information.

30 Claims, 25 Drawing Sheets

ELECTRONIC DEVICE AND METHOD OF SHARING CONTENTS THEREOF WITH OTHER DEVICES

CROSS REFERENCE TO RELATED APPLICATIONS

Pursuant to 35 U.S.C. §119(a), this application claims the benefit of earlier filing date and right of priority to Korean Patent Application No. 10-2010-0045238 filed on May 14, 2010 and Korean Patent Application No. 10-2010-0045239 filed on May 14, 2010, the contents of which are hereby incorporated by reference herein in their entirety.

FIELD OF THE INVENTION

The present invention is directed to an electronic device and a method of sharing contents of the electronic device with other devices.

RELATED ART

An N-screen or three (3)-screen play service allows connecting a plurality of electronic devices, such as a television, a personal computer, and a cellular phone, with each other and seamlessly display of the same content on at least one of screens belonging to the plurality of electronic devices. To support the N-screen or 3-screen play service, the structure and/or software of the electronic devices need to be further improved.

SUMMARY

According to an embodiment of the present invention, an electronic device includes a wireless communication unit wirelessly communicating with any of a plurality of external devices which each include a display, a display displaying content including specific content, an input unit receiving an input for selecting the specific content, and a controller. The controller searches for an external device that is available for communication with the electronic device, establishes communication via the wireless communication unit with a selected first external device, which is one of the plurality of external devices identified as a result of the search for an external device, receives content specification information from the first external device to determine the first external device's capability to display the specific content, and causes displaying of the specific content on the display of the first external device upon determining that the first external device is capable of displaying the specific content based on the content specification information.

According to another embodiment of the present invention, a method of sharing content between an electronic device and an external device includes selecting, by the electronic device, specific content to be displayed at an external device or displaying the specific content on a display of the electronic device, searching, by the electronic device, for at least one external device that is capable of communicating with the electronic device, establishing wireless communication between the electronic device and searched at least external device, receiving, by the electronic device, content specification information from the at least one external device to determine the at least one external device's capability to display the specific content, determining, by the electronic device, that the at least one external device is capable of displaying the specific content based on the content specification information, and causing, by the electronic device, displaying the specific content at the at least one external device that are determined to have the capability to display the specific content.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION

The present invention will now be described more fully with reference to the accompanying drawings, in which exemplary embodiments of the invention are shown. The present invention may, however, be embodied in many different forms and should not be construed as being limited to the embodiments set forth herein. Rather, the embodiments described below are provided so that this disclosure will be thorough and complete, and will fully convey the concept of the invention to those skilled in the art.

Hereinafter, an electronic device relating to the present invention will be described in more detail with reference to the accompanying drawings. In the following description, suffixes "module" and "unit" are given to components of the electronic device in consideration of only facilitation of description and do not have meanings or functions discriminated from each other.

Figure 1:
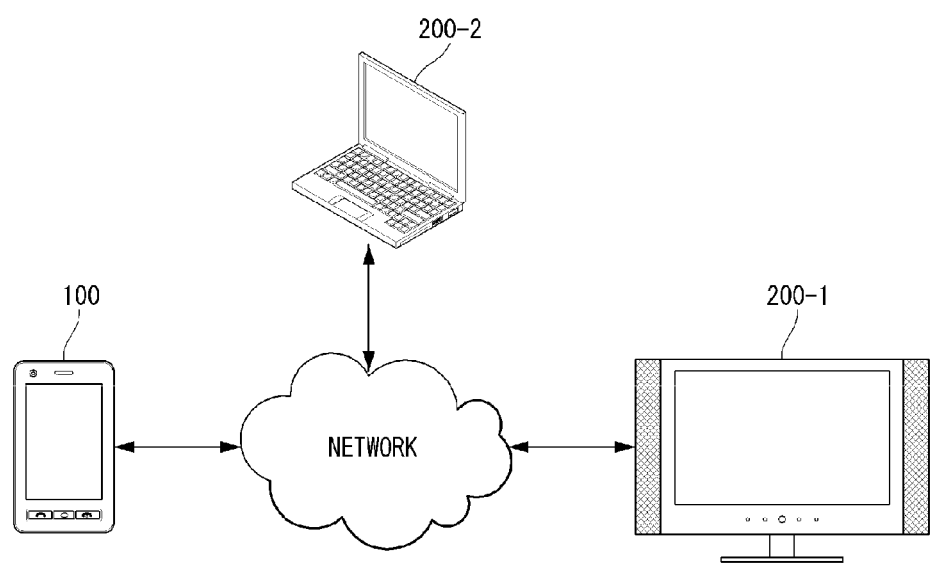
FIG. 1 illustrates a network allowing content sharing among a plurality of electronic devices according to an embodiment of the present invention.

Hereinafter, exemplary embodiments of the present invention will be described in greater detail with reference to the accompanying drawings. Referring to FIG. 1, an electronic device 100 is connected to one or more external electronic devices 200-1 and 200-2 with an image displaying capability over a network. The electronic device 100 may share content with the external electronic devices 200-1 and 200-2 by transferring the content from the electronic device 100 to the external electronic devices 200-1 and 200-2 so that the external electronic devices 200-1 and 200-2 may display the content or by receiving the content from the external electronic devices 200-1 and 200-2 to display the contents on a display of the electronic device 100. The electronic device 100 may employ various communication schemes, such as WiFi, direct WiFi, Zigbee®, UWB (Ultra-Wide Band), or Bluetooth® to communicate with the external electronic devices 200-1 and 200-2. Further, according to a communication scheme, the electronic device 100 may be connected to the external electronic devices 200-1 and 200-2 directly or via an access point to transmit and receive data.

Although according to FIG. 1, the electronic device 100 is a cellular phone and the external electronic devices 200-1 and 200-2 are a television and a laptop computer, respectively, the present invention is not limited thereto. According to an embodiment, the electronic device 100 may be implemented as a smart phone, a laptop computer, a digital broadcasting terminal, a PDA (Personal Digital Assistants), a PMP (Portable Multimedia Player), a navigation system, a desktop computer, a set-top box, a digital camera, and the like.

Figure 2:
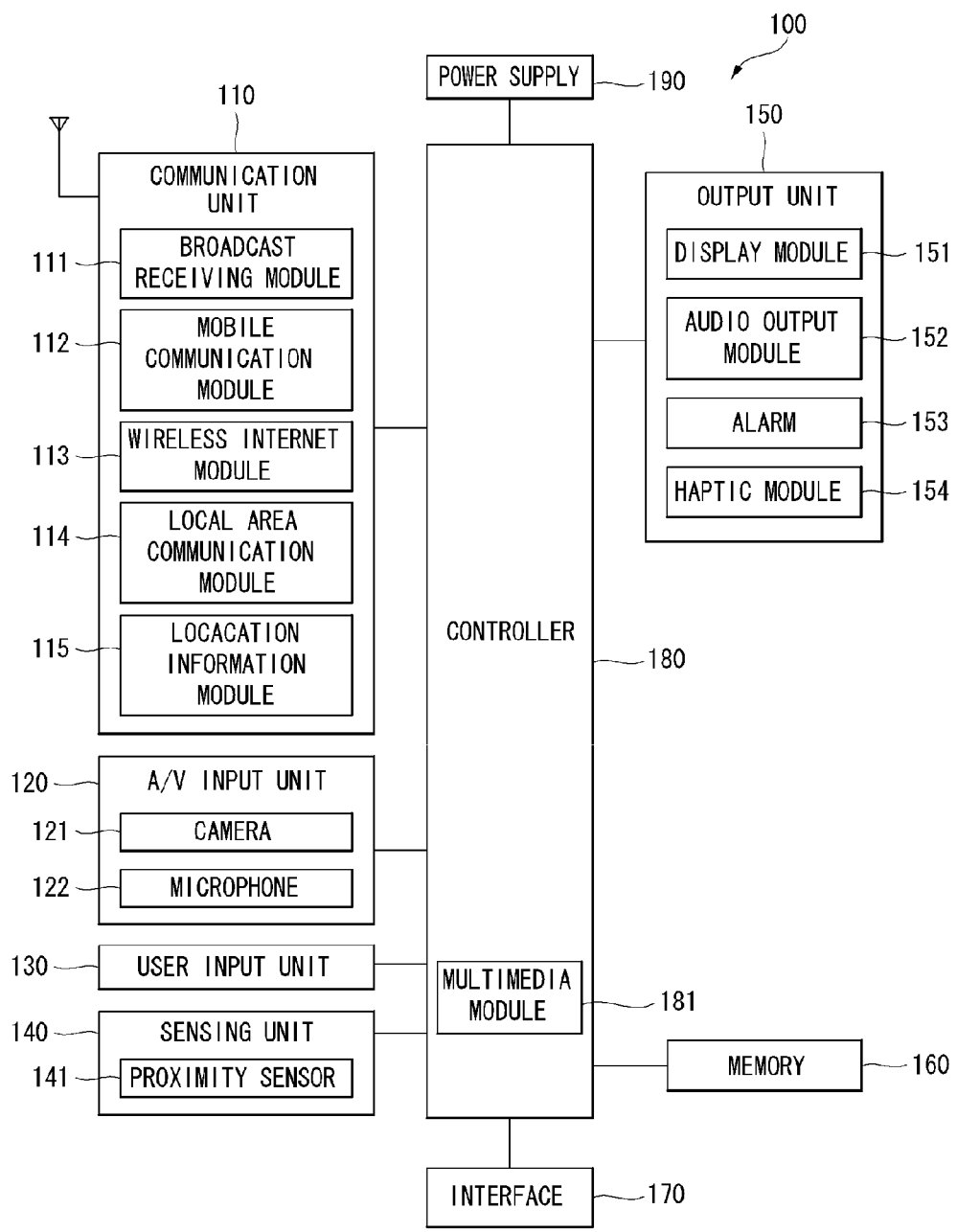
FIG. 2 is a block diagram illustrating an electronic device according to an embodiment of the present invention.

FIG. 2 is a block diagram of an electronic device 100 according to an embodiment of the present invention. Referring to FIG. 2, an electronic device 100 may include a communication unit 110, an audio/video (A/V) input unit 120, a user input unit 130, a sensing unit 140, an output unit 150, a memory 160, an interface 170, a controller 180 and a power supply 190. Some of the components shown in FIG. 1 may not be essential and the number and configuration of components included in the electronic device 100 may be varied.

The communication unit 110 may include at least one module that enables communication between the electronic device 100 and a communication system or between the electronic device 100 and a network in which the electronic device 100 is located. For example, the communication unit 110 may include a broadcasting receiving module 111, a mobile communication module 112, a wireless Internet module 113, a local area communication module 114 and a position information module 115.

The broadcasting receiving module 111 receives broadcast signals and/or broadcast related information from an external broadcast management server through a broadcast channel. The broadcast channel may include a satellite channel and a terrestrial channel. The broadcast management server may be a server that generates and transmits broadcast signals and/or broadcast related information or a server that receives previously created broadcast signals and/or broadcast related information and transmits the broadcast signals and/or broadcast related information to the electronic device. The broadcast signals may include not only TV broadcast signals, radio broadcast signals and data broadcast signals but also signals in the form of combination of a TV broadcast signal and a radio broadcast signal.

The broadcast related information can be information on a broadcast channel, a broadcast program or a broadcast service provider. The broadcast related information can be provided even through a mobile communication network. In this case, the broadcast related information can be received by the mobile communication module 112.

The broadcast related information can exist in various forms. For example, the broadcast related information can exist in the form of electronic program guide (EPG) of digital multimedia broadcasting (DMB) or in the form of electronic service guide (ESG) of digital video broadcast-handheld (DVB-H).

The broadcast receiving module 111 receives broadcast signals using various broadcasting systems. Particularly, the broadcast receiving module 111 can receive digital broadcast signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcast receiving module 111 can be constructed to be suited to broadcasting systems providing broadcast signals other than the above-described digital broadcasting systems. The broadcast signals and/or broadcast related information received through the broadcast receiving module 111 can be stored in the memory 160.

The mobile communication module 112 transmits/receives a radio signal to/from at least one of a base station, an external device and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth®, radio frequency identification (RFID), infrared data association (IrDA), ultra wideband (UWB) and ZigBee® can be used as a local area communication technique.

The location information module 115 confirms or obtains the location of the electronic device 100. A global positioning system (GPS) module is a representative example of the location information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Still referring to FIG. 2, the A/V input unit 120 is used to input an audio signal or a video signal and may include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the communication unit 110. The electronic device 100 can include at least two cameras 121 according to constitution of the electronic device 100.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the electronic device 100 from a user. The user input unit 130 may include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. Furthermore, the sensing unit 140 can sense whether the power supply 190 supplies power and whether the interface 170 is connected to an external device. The sensing unit 140 may include a proximity sensor 141.

The output unit 150 generates visual, auditory or tactile output and may include the display module 151, an audio output module 152, an alarm 153 and a haptic module 154.

The display module 151 displays information processed by the electronic device 100. For example, the display module 151 displays user interface (UI) or graphic user interface (GUI) related to a telephone call when the electronic device 100 is in the call mode. The display module 151 displays a captured or/and received image, UI or GUI when the electronic device 100 is in the video telephony mode or the photographing mode.

The display module 151 may include at least a liquid crystal display (LCD), a thin film transistor liquid crystal display, an organic light-emitting diode display, a flexible display or a three-dimensional (3-D) display. Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the electronic device 100 through an area of the body of the electronic device 100, which is occupied by the display module 151.

The electronic device 100 may include at least two display modules 151 according to constitution of the electronic device 100. For example, the electronic device 100 can include a plurality of displays that are arranged on a single face at a predetermined distance or integrated. Otherwise, the plurality of displays can be arranged on different sides of the electronic device 100.

When the display module 151 and a sensor sensing touch (referred to as a touch sensor hereinafter) form a layered structure, such a combination is referred to as a touch screen and can be used as an input device as well as an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display module 151.

Still referring to FIG. 2, the proximity sensor 141 may be located in an internal region of the electronic device 100, surrounded by the touch screen, or near the touch screen. The proximity sensor 141 senses an object approaching a predetermined sensing face or an object located near the proximity sensor 141 using electromagnetic force or infrared rays without having mechanical contact. The proximity sensor 141 may have lifetime longer than that of a contact sensor and have wider application.

The proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, and the like. A capacitive touch screen is constructed such that proximity of a pointer is detected through a variation in an electric field according to the proximity of the pointer. In this case, the touch screen (touch sensor) can be classified as a proximity sensor 141.

For convenience of explanation, an action of approaching the pointer to the touch screen while the pointer is not in contact with the touch screen such that location of the pointer on the touch screen is recognized is referred to as "proximity touch" and an action of bring the pointer into direct contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor 141 senses proximity touch and a proximity touch pattern (for example, a proximity touch distance, a proximity touch direction, a proximity touch velocity, a proximity touch time, a proximity touch position, or a proximity touch moving state). Information corresponding to the sensed proximity touch action and proximity touch pattern can be displayed on the touch screen.

The audio output module 152 can output audio data received from the communication unit 110 or stored in the memory 160 in a call signal receiving mode, a telephone call mode or a recording mode, a speech recognition mode and a broadcast receiving mode. The audio output module 152 outputs audio signals related to functions (for example, a call signal incoming tone, a message incoming tone, and the like) performed in the electronic device 100. The audio output module 152 may include a receiver, a speaker, a buzzer, and the like.

The alarm 153 outputs a signal for indicating generation of an event of the electronic device 100. Examples of events generated in the electronic device 100 include receiving of a call signal, receiving of a message, input of a key signal, input of touch, and the like. The alarm 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different types of vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to constitution of the electronic device 100.

The memory 160 can store a program for the operation of the controller 180 and temporarily store input/output data (for example, phone book, messages, still images, moving images, and the like). The memory 160 can store data about vibrations and sounds in various patterns, which are output when a touch input is applied to the touch screen.

The memory 160 can include at least a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk or an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices. The interface 170 may include at least a wired/wireless headset port, an external charger port, a wired/wireless data port, a memory card port, a port for connecting a device having a user identification module, an audio I/O port, a video I/O port, or an earphone port, for example.

An identification module is a chip that stores information for authenticating the authority to use the electronic device 100 and may include a user identify module (UIM), a subscriber identity module (SIM) and a universal subscriber identity module (USIM). A device (referred to as an identification device hereinafter) including the identification module can be manufactured in the form of a smart card. Accordingly, the identification device can be connected to the electronic device 100 through a port.

The interface 170 can serve as a path through which power from an external cradle is provided to the electronic device 100 when the electronic device 100 is connected to the external cradle or a path through which various command signals inputted by the user through the cradle to the electronic device 100. The various command signals or power input from the cradle can be used as a signal for confirming whether the electronic device 100 is correctly set in the cradle.

The controller 180 controls the overall operation of the electronic device 100. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the electronic device 100 under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

The structure of the external electronic devices 200-1 and 200-2 shown in FIG. 1 is similar to that of the electronic device 100 described in FIG. 2, and thus, further detailed description of the external electronic devices 200-1 and 200-2 will be omitted. The exemplary embodiments disclosed in the present application may be implemented by using the electronic device 100 described in connection with FIGS. 1 and 2.

Hereinafter, various embodiments of a content sharing method in an electronic device and an electronic device implementing the method will be described in greater detail with reference to FIGS. 3 to 5.

Figure 3:
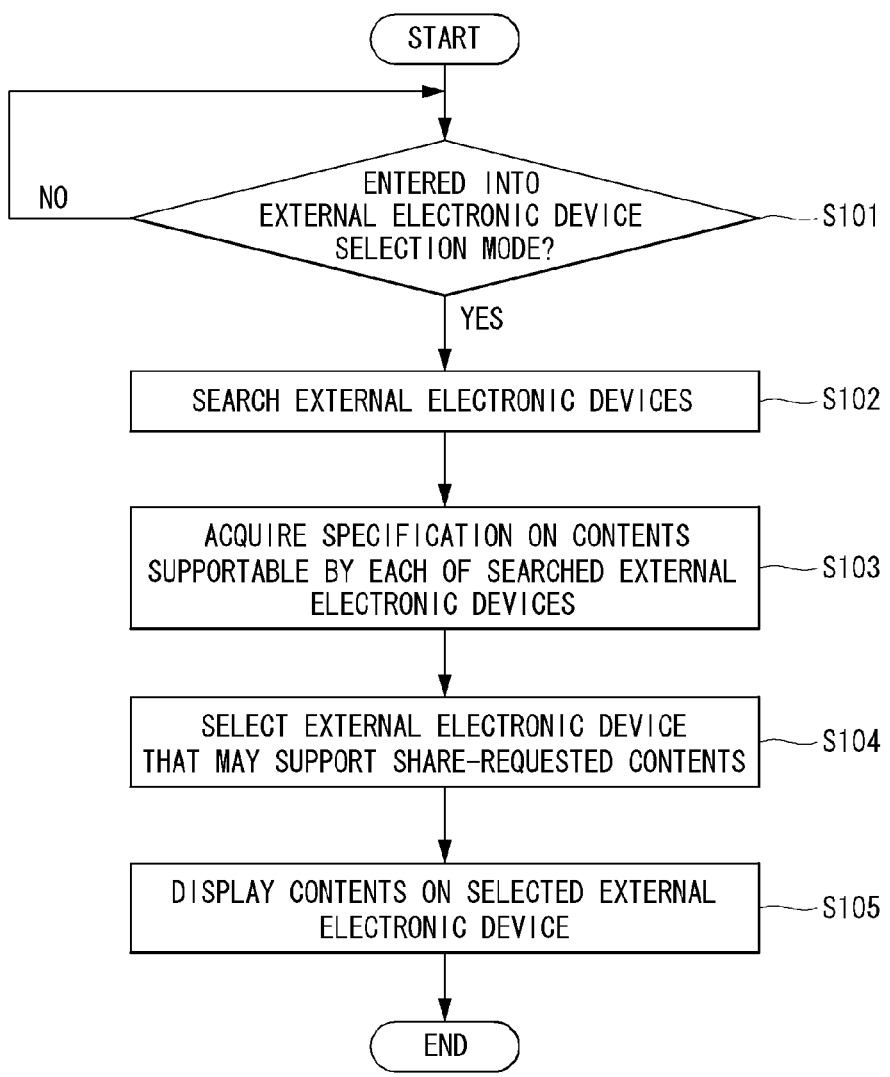
FIG. 3 is a flowchart illustrating a content sharing method in an electronic device according to an embodiment of the present invention.
Figure 4:
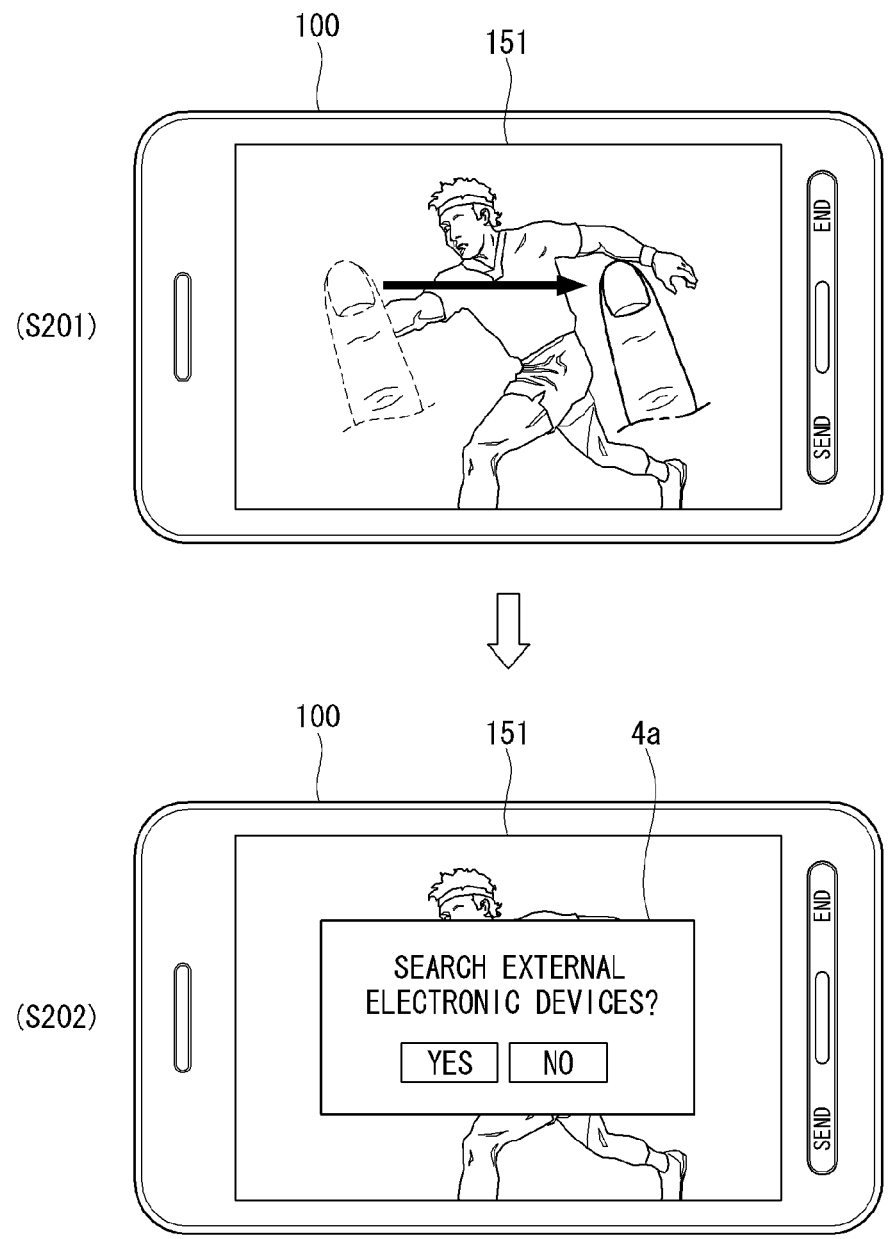
FIG. 4 is a screen view of an electronic device and illustrates entering into an external electronic device selection mode according to an embodiment of the present invention.
Figure 5:
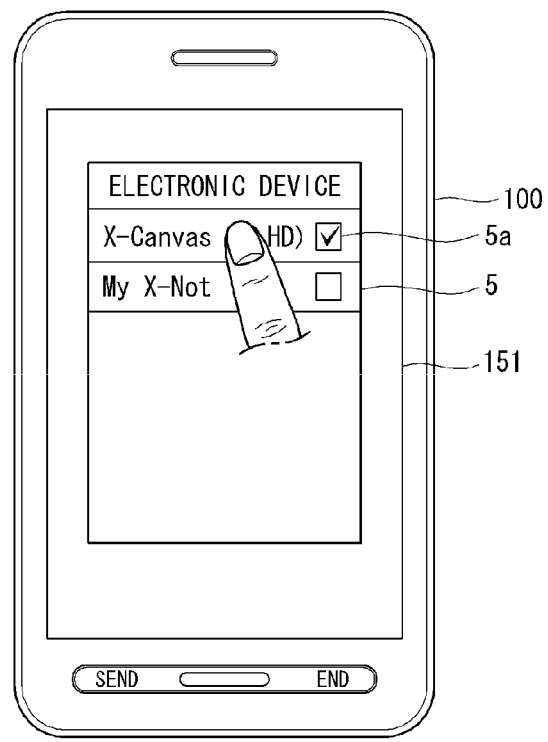
FIG. 5 is a screen view of an electronic device and illustrates selecting an external electronic device with which content is to be shared according to an embodiment of the present invention.

FIGS. 3-5 illustrate a content sharing method in an electronic device according to an embodiment of the present invention. Referring to FIG. 3, when an electronic device 100 enters a selection mode for selecting an external electronic device that may display content to be shared (S101), the controller 180 searches for at least one external electronic device that may be connected with the electronic device 100 through the communication unit 110 (S102). There may be various ways for the controller 180 to enter the selection mode for searching and selecting an external electronic device.

For example, the controller 180 may enter the external electronic device selection mode in response to an input received via a specific key of the user input unit 130. In one aspect of the invention, the controller 180 may start or release the selection mode according to manipulation of the specific key. For example, the controller 180 may operate in the selection mode only when the specific key is touched or pressed continuously, and may exit from the selection mode when the touch or pressure is not sensed any more.

In one aspect, the input for entering the selection mode may be a drag or multi-touch input. For example, the controller 180 enters the selection mode upon receiving a drag input as shown in FIG. 4. Referring to FIG. 4, when a drag input is received (S201) while content is displayed on a display module 151, the controller 180 displays a selection window 4a prompting whether to enter the selection mode to search for an external electronic device with which the content is to be shared (S202). When a user selects "Yes" or provides an instruction to enter the selection mode, the controller 180 searches for at least one external electronic device that may be connected with the electronic device 100 via the communication unit 110.

Alternative to the drag input described above, the controller 180 may also enter the selection mode in response to various types of inputs as discussed below. For example, the input may be a "tapping" input received via the electronic device 100.

According to an embodiment, the controller 180 may sense a moving speed of the electronic device 100 through the sensing unit 140 and may enter the selection mode when the sensed moving speed reaches a preset speed while the content is displayed on the display module 151. That is, the controller 180 may enter the selection mode when the user carrying the electronic device 100 is on the move at a speed that is faster than the preset speed.

According to another embodiment, the controller 180 may sense a tilting of the electronic device 100 through the sensing unit 140 and may enter the selection mode when a preset tilted state, for example, a horizontal state, is sensed for a preset period of time while the content is displayed on the display module 151.

According to yet another embodiment, the controller 180 may recognize a voice signal received via the microphone 122 and may initiate or finish the selection mode when the received voice signal is determined to be a control command associated with the selection mode.

According to still another embodiment, the controller 180 may recognize the orientation of the electronic device 100 through the sensing unit 140 and may enter the selection mode when the orientation of the electronic device 100 is changed into a specific orientation, for example, when the front surface of the electronic device 100 faces toward the floor.

According to still yet another embodiment, the controller 180 may detect the brightness of external light through the sensing unit 140 and may enter the selection mode when the brightness of the external light is higher or lower than a set threshold value.

Further referring to FIG. 3, when external electronic devices connectable via the communication unit 110 are searched and detected, the controller 180 acquires specification information with regard to supported types of contents from each of the detected external electronic devices (S103). The specification information may include display information, such as resolution supported by the devices, and resource information, such as supportable codec or drivable content playback program.

Thereafter, the controller 180 selects an external electronic device that has capability of displaying the content to be shared based on the specification information acquired from the external electronic devices (S104). For example, if the content to be shared is an HD (High Definition) moving picture, the controller 180 may select only the external electronic devices having a codec required for reproducing the HD moving picture. The controller 180 may select the external electronic device to display the shared content automatically upon determining or confirming the capability of the searched external electronic device or select the external electronic device in response to a user input when a user designate an external electronic device to share the content with.

When one or more external electronic devices are selected, the controller 180 controls the selected external electronic devices so that all of the selected external electronic devices may display the share content concurrently (S105). For example, when the content is a moving picture, the controller 180 controls the selected one or more external electronic devices to reproduce and display the moving picture at the selected one or more external electronic devices.

When the content to be shared is stored in the memory 160, the controller 180 may transfer the content to the selected external electronic devices so that the selected external electronic devices may display the contents. Alternatively, when the content to be shared is stored externally in other external storage device, the controller 180 may transfer the content from the other external storage device to the selected external electronic devices to display the content at the selected external electronic devices.

When the external electronic devices are selected, the controller 180 may control the selected electronic devices so that the selected external electronic devices may display the content automatically or only when the content is requested to be transmitted to the selected external electronic devices. In the latter case, the electronic device 100 may receive the request for displaying the content in various manners.

For example, the controller 180 may receive a request for transmitting the content to the selected external electronic devices through the selection window. Referring to FIG. 5, when the external electronic devices are selected in step S104, the controller 180 displays a list 5 of the selected external electronic devices on the display module 151. The list 5 may include a selection button 5a for each of the external electronic devices displayed so that a user may select at least one desired external electronic device checking the selection button 5a. For example, as shown in FIG. 5, when only the external device "X-Canvas (HD)" is selected, the controller 180 may display the content to be shared only on the "X-Canvas (HD)."

Figure 6:
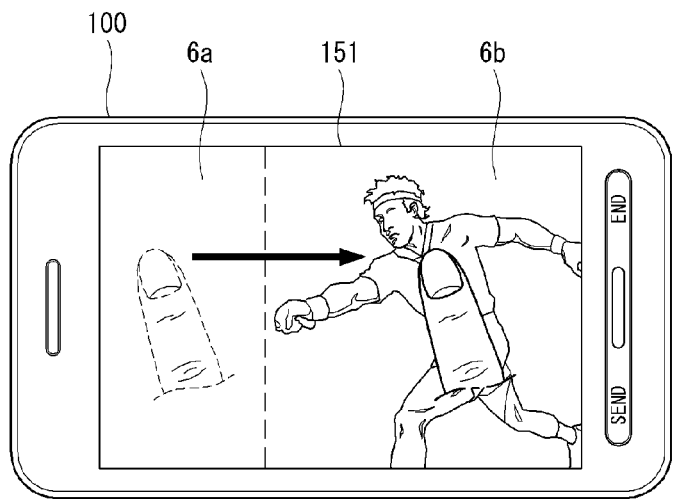
FIG. 6 is a screen view of an electronic device and illustrates moving content displayed on a display screen of the electronic device according to an embodiment of the present invention.

In one embodiment, when a drag input, moving in a specific direction or in a preset range of speeds, is received on the touch screen of the display module 151, the controller 180 may consider the drag input as a content transfer request. For example, the controller 180 may control the display module 151 so that the position of displayed content is moved according to the direction of the drag input, as shown in FIG. 6. This action allows a user to intuitively recognize that the content is being moved or transferred to another device to be displayed at the other device. Referring to FIG. 6, when a drag input is received, the controller 180 may gradually move the displayed content from a first area 6a to a second area 6b on the display module 151.

In another embodiment, the controller 180 may also receive the content transfer request in response to a change in the orientation or tilting of the electronic device 100 sensed through the sensing unit 140 after an external electronic device is selected. For example, when the electronic device 100 is inclined by more than a preset threshold value in a specific direction from a horizontal orientation, the controller 180 may determine such an inclination as an input for transferring the content to the selected external electronic device. Here, the controller 180 may recognize the inclined direction of the electronic device 100 and gradually move the position of the displayed content on the display module 151 so that a user may intuitively recognize that the content is being transferred to another device.

In yet another embodiment, the controller 180 may measure the strength of blowing wind through the sensing unit 140 and when the measured strength of wind is more than a preset threshold value, the controller 180 may determine the wind as an input for a content transfer request. Here, the controller 180 may recognize the direction of the wind and gradually move the position of the displayed content on the display module 151 based on the direction of the wind so that a user may intuitively recognize that the content is being transferred to another device. For example, when a user blows his breath toward the electronic device 100, the controller 180 may recognize the direction of the breath and control the display module 151 so that the displayed content gradually moves in the opposite direction of the breath blew.

In still another embodiment, when the content is displayed on the selected external electronic device, the controller 180 may continue or stop displaying the shared content on the display module 151. For example, the controller 180 stops displaying the content on the display module 151 when the content has been transferred to and is being displayed on the selected external device. However, if the content cannot be displayed on the selected external electronic device, for example, because other content is being displayed on the selected electronic device or because the content is not permitted to be displayed on the selected electronic device, the controller 180 may display the content through the display module 151. In this case, the controller 180 may control the display module 151 so that the displayed content is gradually moved back to the original position to indicate that the request for contents sharing failed.

According to the above discussed embodiment, a user does not have to identify the specification information of external electronic devices manually to select external electronic devices that may support content to be shared. Thus, proper external electronic devices may be automatically searched by the electronic device 100, thus enhancing the user's convenience.

A content sharing method in an electronic device and an operation of the electronic device implementing the content sharing method according to an embodiment of the present invention will now be described in greater detail with reference to FIGS. 7 to 10.

Figure 7:
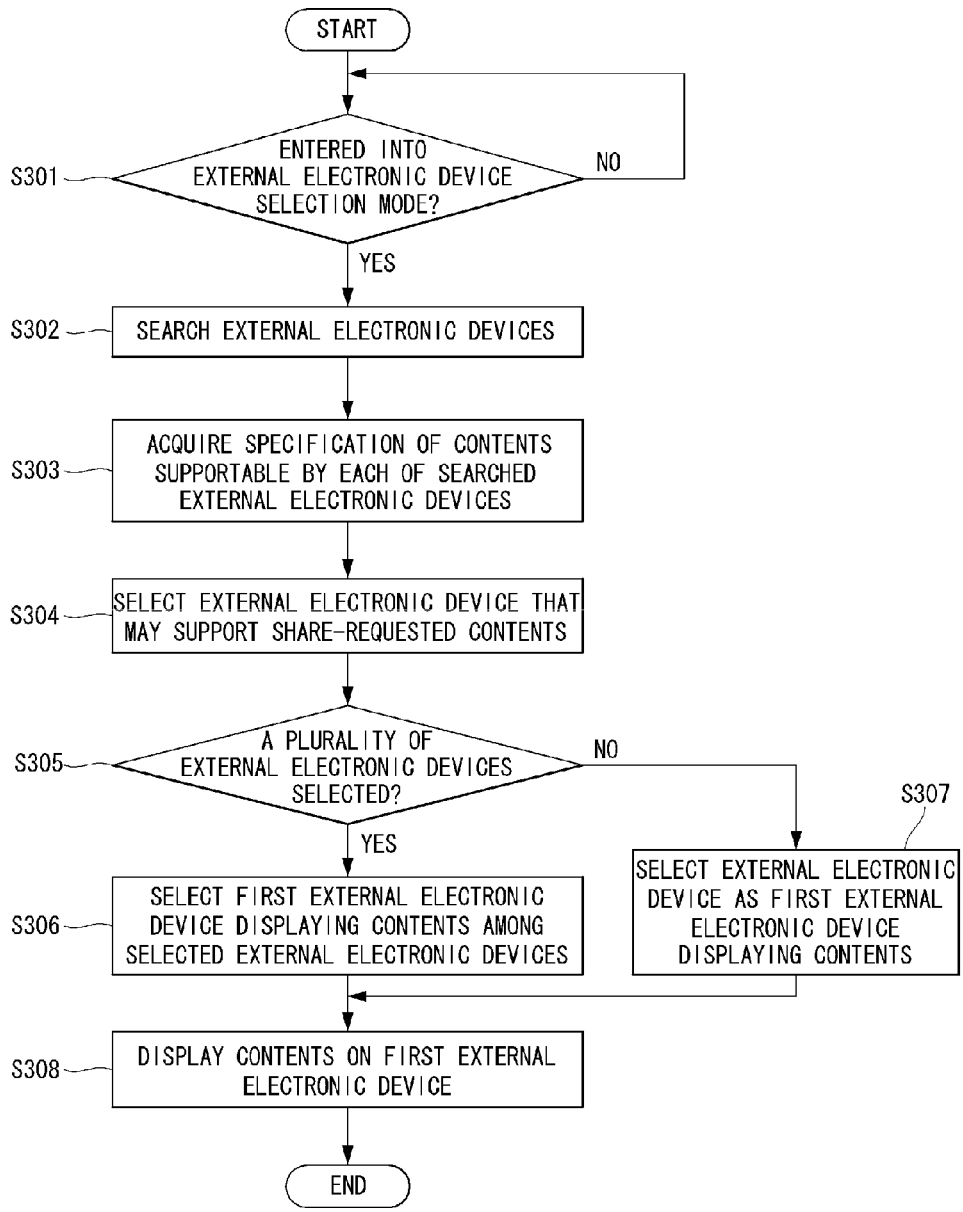
FIG. 7 is a flowchart illustrating a content sharing method in an electronic device according to another embodiment of the present invention.

FIGS. 7-10 illustrate a content sharing method in an electronic device according to an embodiment of the present invention. Steps S301 to S304 in FIG. 7 are substantially identical to S101 to S104 described in FIGS. 3-5, and thus, further detailed description thereof will be omitted.

Referring to FIG. 7, when the electronic device 100 enters a selection mode for selecting an external electronic device (S301), the controller 180 searches for at least one external electronic device that may communicate with the electronic device 100 (S302). The electronic device 100 communicates with the searched at least one external electronic device via the communication unit 110 and obtains content specification information from the searched at least one external electronic device (S303). Subsequently, the controller 180 determines whether the searched at least one external device has a capability to display the content based on the content specification information and selects at least one external electronic device that may execute the content to be shared (S304).

Thereafter, when a plurality of external electronic devices are selected (S304), a first external electronic device that is to display the contents is further selected among the plurality of external electronic devices (S306). When only a single external electronic device is selected (S304, S305), the selected external electronic device is selected as the first external electronic device to display the content provided by the electronic device 100 (S307).

When the first external electronic device is selected (S306 or S307), the controller 180 controls the first external electronic device so that the content is displayed on the first external electronic device (S308). When the content is being displayed on the display module 151 of the electronic device 100 or stored in the memory 160 of the electronic device 100, the controller 180 may transfer the content to the first external electronic device so that the content may be displayed on the first external electronic device. When the content being displayed on the display module 151 is content stored in a second external electronic device, the controller 180 may transfer the content from the second external electronic device to the first external electronic device.

As in the embodiment described in connection with FIGS. 3 to 5, when an external electronic device with which content is to be shared is selected, the controller 180 may display the content on the selected external electronic device automatically or only when the content is requested to be transferred to the selected external electronic device. Further, as in the embodiment described in connection with FIGS. 3 to 5, when the shared content is displayed on the selected external electronic device, the controller 180 may continue or stop displaying the content on the display module 151 based on the setting or circumstance.

With regard to selection of the first external electronic device in S306, the controller 180 may select the first external electronic device in various manners. For example, the controller 180 may display a list of the selected external electronic devices on the display module 151 and the first external electronic device to display the content may be selected from the list via the user input unit 130.

Referring to FIGS. 5 and 7, the controller 180 may display the list of the external electronic devices selected in S304 on the display module 151 as a text-type list 5. Then, when a user selects a specific external electronic device by checking the selection button 5a included in the list 5, the controller 180 chooses the selected specific external electronic device as the first external electronic device. Here, the controller 180 may determine an order of the external electronic devices in the list based on distances between the external electronic devices and the electronic device 100. For example, the controller 180 may display an external electronic device that is most closely positioned with respect to the electronic device 100 at an uppermost position of the list 5. For this purpose, the controller 180 may acquire information on a distance between each external electronic device and the electronic device 100. Such distance information may be acquired using various types of information acquired from each external electronic device.

For example, in one embodiment, the controller 180 may acquire location information from each external electronic device and compare the acquired location information with a current location of the electronic device 100 to acquire the information on the distance between each external electronic device and the electronic device 100.

In another embodiment, the controller 180 may obtain the strength of a signal received by the communication unit 110 from each external electronic device and acquire the distance information between the electronic device 100 and each external electronic device based on the strength of the received signal.

In yet another embodiment, the controller 180 may obtain time information indicating when a signal is received by the communication unit 110 from each external electronic device and acquire the distance information between the electronic device 100 and each external electronic device based on the time information.

In still another embodiment, the controller 180 may transmit an ultrasonic wave through the audio output module 152 and measure how long it takes for the transmitted ultrasonic wave to return via the sensing unit 140. Based on the return time, the controller 180 may acquire the distance information between the electronic device 100 and each external electronic device.

In still yet another embodiment, the controller 180 may radiate an infrared ray through an infrared communication unit. The controller 180 may acquire the distance information using triangulation based on a radiation angle of the infrared ray. Further, the controller 180 may also acquire the distance information based on the strength of the infrared ray reflected by each of the external electronic devices, time taken for the infrared ray reflected by each external electronic device to return, or the strength of an infrared ray emitted from each external electronic device.

In still yet another embodiment, the distance information between the electronic device 100 and each external electronic device may be an absolute distance between the electronic device 100 and each external electronic device, or a relative distance for identifying which external electronic device is closer to the electronic device 100 among the searched external electronic devices.

In still yet another embodiment, an order of a plurality of external electronic devices that are determined to be located in the same distance based on the distance between the electronic device 100 and each external electronic device and a tolerance range in the list may be determined as follows:

For example, the controller 180 may determine a display order depending on the specification information of each of the plurality of external electronic devices determined to be located in the same distance.

Further, the controller 180 may obtain pose information or a vertical position of the electronic device 100 through the sensing unit 140 when the plurality of external electronic devices are determined to be located in the same distance, and may determine a display order of the external electronic devices based on the obtained pose information or vertical position. For example, when an upper portion of the electronic device 100 is determined to be inclined lower than a lower portion of the electronic device 100, the controller 180 may determine that the electronic device 100 is oriented downward. Accordingly, the controller 180 may display an external electronic device that is determined to be located at a lower position first in the list.

Furthermore, the controller 180 may store the number of times for each external electronic device that has shared content with the electronic device 100 and may determine a display order of each of the plurality of external electronic devices determined to be located in the same distance based on the number of times. For example, the controller 180 may display an external electronic device having the most number of times first in the list.

Figure 8:
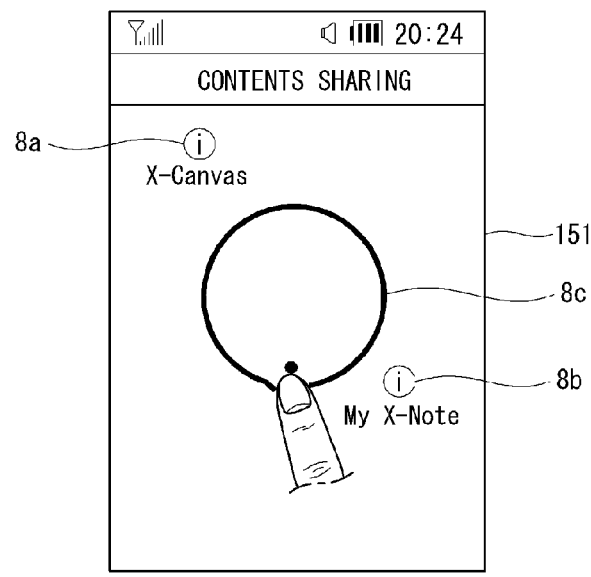
FIG. 8 is a screen view of an electronic device and illustrates displaying a list of external electronic devices searched by the electronic device according to an embodiment of the present invention.

FIG. 8 illustrates an example of displaying a list of the selected external electronic devices on the display module 151. Referring to FIG. 8, the controller 180 displays a list of the selected external electronic devices using corresponding icons 8a and 8b. Further, the controller 180 may display a rotatable control icon 8c used for selecting at least one of the external electronic devices represented by the icons 8a and 8b. For example, the controller 180 may display the icons 8a and 8b around the control icon 8c so that the control icon 8c may be rotated by dragging and a pointer of the control icon 8c may be directed to one of the icons 8a and 8b. When the pointer of the control icon 8c is directed to one of the icons 8a and 8b, the external electronic device corresponding to the one of the icons 8a and 8b is selected as the first external electronic device.

In one embodiment, the controller 180 may arrange the corresponding icons 8a and 8b on the display module 151 according to the actual arrangement of the external electronic devices with respect to a current position of the electronic device 100. For example, referring to FIG. 8, the external electronic device corresponding to the icon 8a is positioned to the left of the electronic device 100 and the external device corresponding to the icon 8*b* is positioned to the right of the electronic device 100, the control icon 8*c* representing the position of the electronic device 100. For this purpose, the controller 180 may acquire relative location information between the electronic device 100 and each external electronic device, using the location information acquired from each external electronic device.

Figure 9:
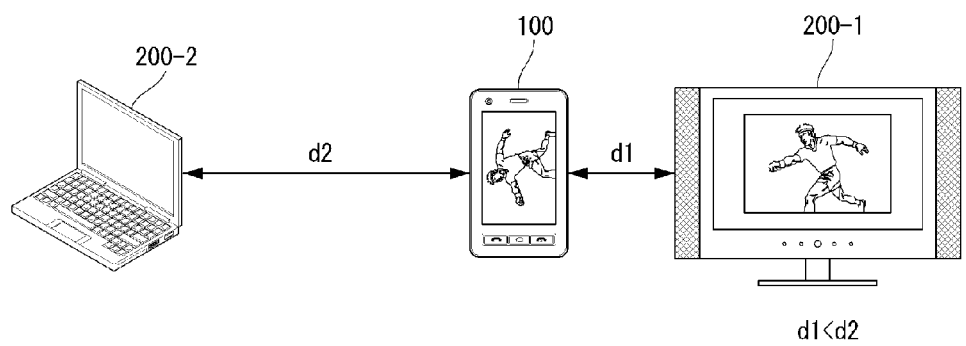
FIG. 9 illustrates selecting an external electronic device with which content is to be shared based on a distance between an electronic device providing the content and the external electronic device according to an embodiment of the present invention.

In another embodiment, the controller 180 may automatically select the first external electronic device based on the locations of the selected external electronic devices. For example, the controller 180 may acquire distance information between the electronic device 100 and each of the searched external electronic devices and may select an external electronic device that is positioned closest to the electronic device 100 as the first external electronic device based on the acquired distance information. Referring to FIG. 9, when external electronic devices, for example, one television 200-1 and one laptop computer 200-2, are searched and selected, the controller 180 acquire distance information d1 between the electronic device 100 and the external electronic device 200-1 and distance information d2 between the electronic device 100 and the external electronic device 200-2. Based on the acquired distance information d1 and d2, the controller 180 recognizes that the television 200-1 is positioned closer than the laptop computer 200-2 from the electronic device 100. Thus, the controller 180 determines to display the content on the television 200-1 by transferring the content from the electronic device to the television 200-1.

According to the above described embodiments, external electronic devices that are capable of displaying the content are selected and an external electronic device that is positioned closest to the electronic device 100 is selected as the first external electronic device among the capable external electronic devices to display the content provided by the electronic device 100. However, the present invention is not limited thereto. For example, the searched external electronic devices may be arranged according to their respective distances from the electronic device 100 regardless of their capability of displaying the content and then external electronic devices that are capable of displaying the content may be identified. In this case, an external electronic device that satisfies the condition first may be selected as the first external electronic device.

According to the above described embodiments, a user does not have to identify the specifications of external electronic devices manually to select external electronic devices that can support sharing of the content with the electronic device 100 because appropriate external electronic devices may be automatically selected according to the set condition. Thus, user's convenience may be enhanced. Further, since an external electronic device that is optimal for displaying the shared content with respect to the user's location is automatically selected and the content is displayed through the selected optimal external electronic device, the user may be relieved of burdensome manipulation of the electronic device 100.

Figure 10:
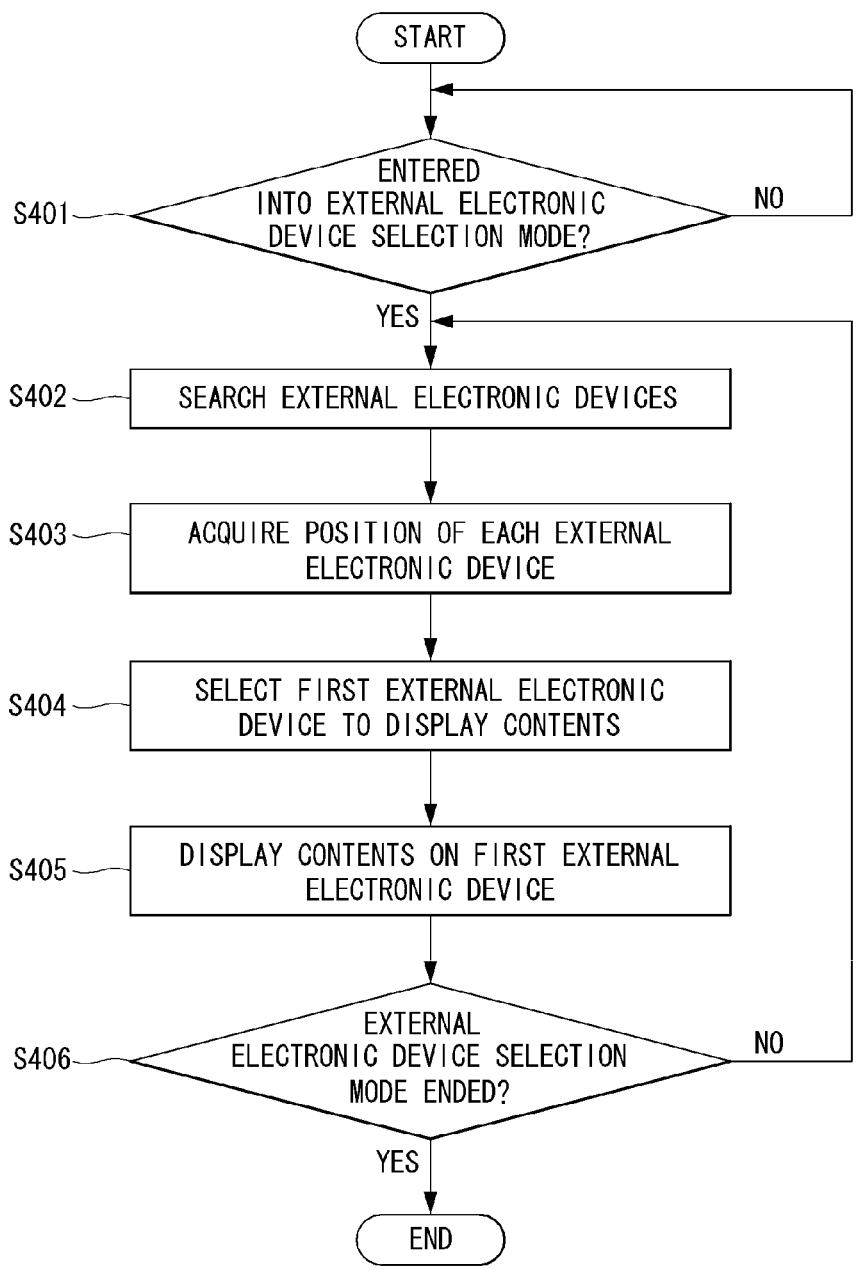
FIG. 10 is a flowchart illustrating a content sharing method in an electronic device according to yet another embodiment of the present invention.

FIGS. 10-16 illustrate a content sharing method in an electronic device according to another embodiment of the present invention. Referring to FIG. 10, when the electronic device 100 enters a selection mode for selecting an external electronic device with which content is to be shared (S401), the controller 180 searches for at least one external electronic device that may be connected via the communication unit 110 (S402). A method of entering the selection mode is substantially similar to that described in connection with FIGS. 3 to 5, and thus, further detailed description thereof will be omitted.

When connectable external electronic devices are searched for and detected via the communication unit 110, the controller 180 acquires location information of each of the searched external electronic devices (S403). Based on the acquired location information, the controller 180 selects a first external electronic device that is to display the shared content among the detected external electronic devices (S404). The controller 180 controls the first external electronic device to display the shared content (S405).

According to an embodiment, when the external electronic devices are selected, the controller 180 may allow the content to be displayed through the selected external electronic devices automatically or only when the content is requested to be transferred to the selected external electronic devices. As described above in connection with FIGS. 3 to 5, when the content to be shared is displayed on the selected external electronic devices as in S105 of FIG. 3, the controller 180 may continue displaying the content on the display module 151 or stop displaying the content on the display module 151.

Steps S402 to S405 may be repeatedly performed until the external electronic device selection mode is finished. The selection mode may be finished in various manners. For example, the controller 180 may end the selection mode in response to an input received via a specific key of the user input unit 130. According to an embodiment, when a specific touch input, such as a drag or multi-touch input, is received during the selection mode, the controller 180 may end the selection mode. According to another embodiment, when the electronic device 100 is tapped during the selection mode, the controller 180 may end the selection mode. According to yet another embodiment, the controller 180 may acquire a moving speed of the electronic device 100 through the sensing unit 140, and when the moving speed of the electronic device 100 is determined to be less than a preset speed while in the selection mode, the controller 180 may end the selection mode. According to still another embodiment, the controller 180 may recognize tilting of the electronic device 100 through the sensing unit 140, and when the orientation of the electronic device 100 is out of a predetermined range, for example, when the orientation of the electronic device 100 is changed from a vertical orientation to a horizontal orientation during the selection mode, the controller 180 may end the selection mode.

In S404, the controller 180 may select the first external electronic device in various methods. For example, the controller 180 may select an external electronic device that is positioned closest to the electronic device 100 as the first external electronic device among the searched or detected external electronic devices, as shown in FIG. 9. According to an embodiment, the controller 180 may acquire distance information between the electronic device 100 and each of external electronic devices and may determine which external electronic device is positioned closest to the electronic device 100 based on the acquired distance information.

When a plurality of external electronic devices are determined to be close to the electronic device 100 based on accuracy of measured distance between the electronic device 100 and each external electronic device and a tolerance range, the controller 180 may assign a priority to only one of the plurality of external electronic devices and select the external electronic device having the highest priority as the first external electronic device. A method of acquiring the distance information between the electronic device 100 and each external electronic device is substantially identical to that described above in connection with FIGS. 8-10, and thus, further detailed description thereof will be omitted. A method of assigning a priority to a plurality of external electronic devices determined to be located in the same distance from the electronic device 100 may be substantially equal to the method of assigning a priority to external electronic devices determined to be located in the same distance to determine an order of the external electronic devices to be arranged in the list, as described in connection with FIGS. 8-10, and thus, further detailed description thereof will be omitted.

According to an embodiment, the controller 180 may determine in which direction the electronic device 100 is oriented (hereinafter, "user-oriented direction") and may select an external electronic device corresponding to the user-oriented direction as the first external electronic device among the detected external electronic devices. The controller 180 may acquire the user-oriented direction in various manners.

For example, the controller 180 may recognize the user-oriented direction by performing image recognition on an image captured by the camera 121. Specifically, the controller 180 may acquire information such as user's viewing direction or identification information on an external electronic device toward which the electronic device 100 is oriented from the image captured by the camera 121 and may recognize the user-oriented direction based on such information. When the identification information of the external electronic device is acquired through the camera 121, identification information representing each external electronic device may appear on the front surface of the external electronic device.

Figure 11:
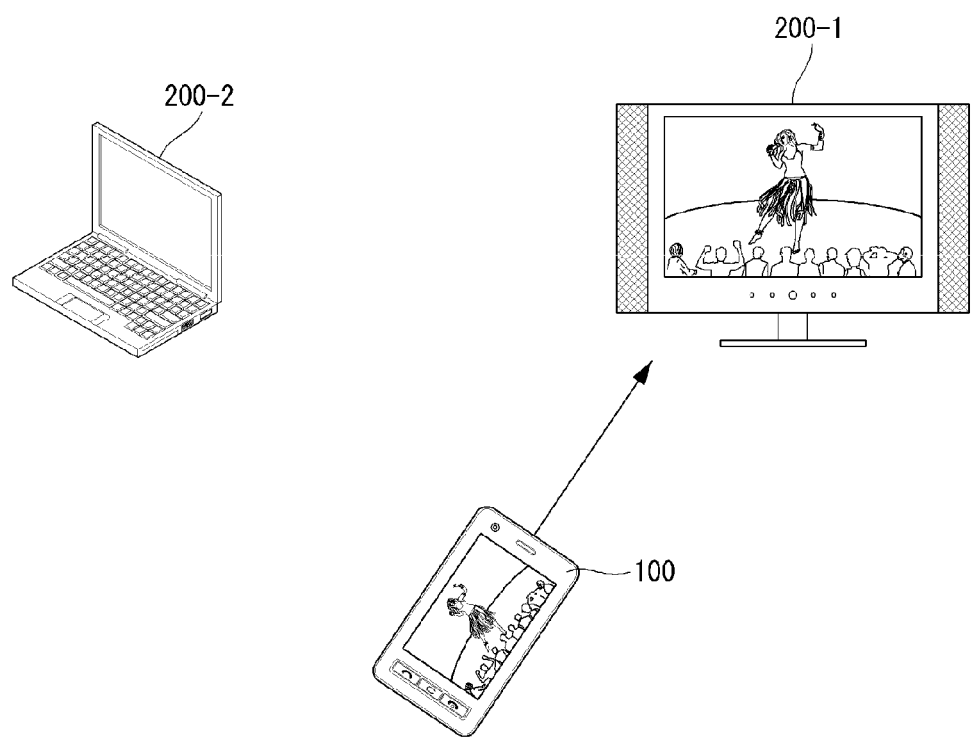
FIG. 11 illustrates selecting an external electronic device with which content is to be shared by pointing an electronic device providing the content toward the external electronic device according to an embodiment of the present invention.

According to an embodiment, the controller 180 may measure an azimuth or a change of the azimuth of the electronic device 100 using the sensing unit 140 and may determine the user-oriented direction based on the azimuth or change of the azimuth. FIG. 11 illustrates an example of determining the user-oriented direction by measuring an azimuth of the electronic device 100. Referring to FIG. 11, the controller 180 determines the user-oriented direction, i.e., a direction toward which the electronic device 100 is oriented, based on an azimuth measured by the sensing unit 140. Then, the controller 180 selects an external electronic device that is located in a position corresponding to the user-oriented direction, for example, television 200-1, as the first external electronic device based on the location information acquired from each of the external electronic devices 200-1 and 200-2 and displays the shared content through the television 200-1. In other words, a user may select the first external electronic device by pointing the electronic device 100 toward a desired external electronic device and when the user points the electronic device 100 toward the television 200-1, the content of the electronic device 100 is shared with and displayed at the television 200-1, as shown in FIG. 11.

Figure 12:
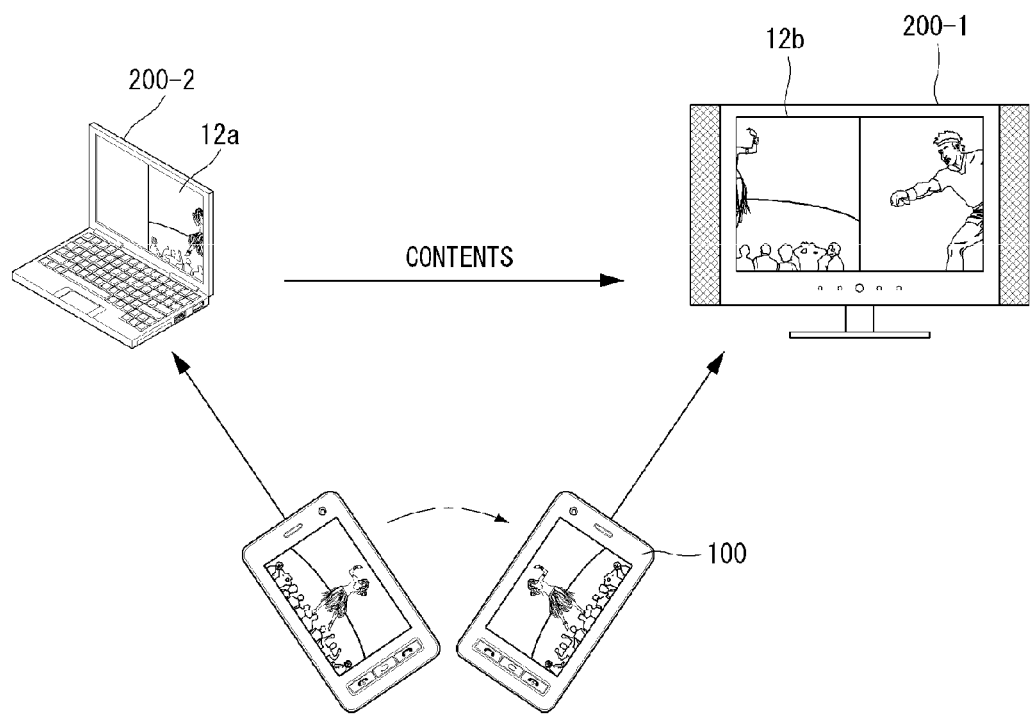
FIG. 12 illustrates transferring content displayed on a first external device to a second external device by changing a pointing direction of an electronic device providing the content according to an embodiment of the present invention.

FIG. 12 illustrates an example of recognizing the user-oriented direction based on a change of an azimuth of the electronic device 100. Referring to FIG. 12, when the electronic device 100 enters a selection mode for selecting another external electronic device while the content is displayed through an external device, for example, a laptop computer 200-2, the controller 180 recognizes that an azimuth of the electronic device 100 is being changed through the sensing unit 140. Based on the recognized change of the azimuth, the controller 180 may reselect the first external electronic device. That is, when the controller 180 determines the user-oriented direction based on the change of the azimuth, and a television 200-1 corresponding to the user-oriented direction is selected as the first external electronic device to display the content through the television 200-1. As shown in FIG. 12, as the electronic device 100 is rotated from one point to another point, the controller 180 may transfer the shared content 12a displayed on the laptop computer 200-2 to the television 200-1 seamlessly. For example, the controller 180 may push the content 12a that is displayed on the laptop computer 200-2 gradually toward the direction of the television 200-1 such that the content 12b is gradually displayed on the television 200-1 as if the content 12b is moving in from the direction of the laptop computer 200-2.

Figure 13:
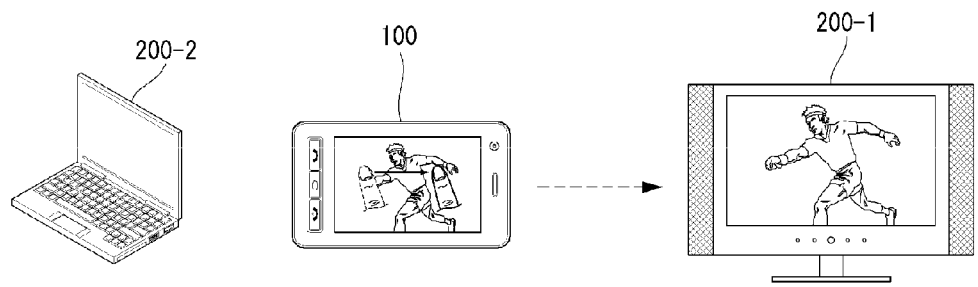
FIGS. 13 and 14 illustrate selecting an external device with which content is to be shared based on a user input received via an electronic device providing the content according to an embodiment of the present invention.
Figure 14:
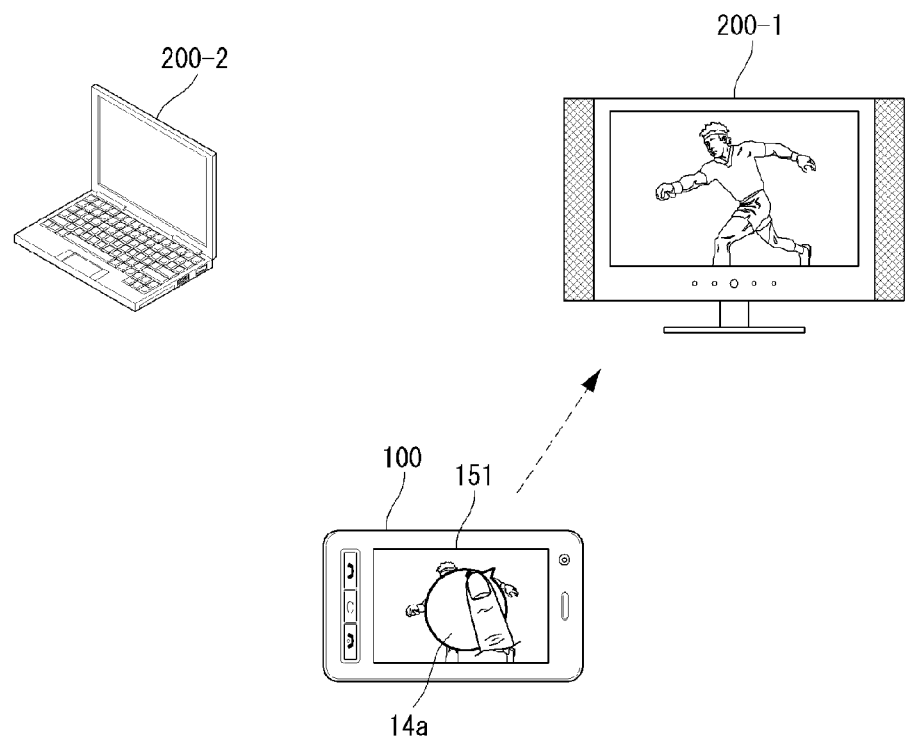

According to an embodiment, the controller 180 may recognize the user-oriented direction based on a drag input received through the touch screen on the display module 151. FIGS. 13 and 14 illustrate examples of recognizing the user-oriented direction based on a drag input. Referring to FIG. 13, the controller 180 recognizes the direction of a drag input received through the touch screen and determines the user-oriented direction based on the recognized direction. For example, when the drag is made in a right-hand direction on the touch screen of the electronic device 100, the controller 180 may determine the right-hand direction of the electronic device 100 as the user-oriented direction. When the user-oriented direction is determined, the controller 180 may select an external electronic device located at a position corresponding to the user-oriented direction, i.e., a television 200-1, as the first external electronic device based on the location information acquired from the external electronic devices 200-1 and 200-2, and display the shared content through the first external electronic device, television 200-1.

Although the position of content displayed on the screen of the electronic device 100 is fixed in FIG. 13, the present invention is not limited thereto. For example, the controller 180 may push out the displayed content gradually according to the direction of the drag so that a user may intuitively identify the transfer of the content to another electronic device. According to an embodiment, when the shared content cannot be displayed through the first external electronic device, the controller 180 may bring back the content toward the original position on the display module 151 so that the user may intuitively recognize a failed transfer of the shared content.

Referring to FIG. 14, the controller 180 displays a rotation icon 14a on the screen of the display module 151. In response to dragging and rotation of the rotation icon 14a, the controller 180 recognizes the direction pointed by the rotation icon 14a as the user-oriented direction. Based on the location information of the external electronic devices 200-1 and 200-2, the controller 180 selects an external electronic device located at a position corresponding to the user-oriented direction, i.e., the television 200-1, as the first external electronic device and displays the content through the first external electronic device. While displaying the rotation icon 14a on the screen, the controller 180 may also display relative locations of the external electronic devices 200-1 and 200-2 as shown in FIG. 8 so that a user may intuitively select a desired external electronic device as the first external electronic device.

According to an embodiment, the controller 180 may select an external electronic device that is located in the same zone as the electronic device 100 as the first external electronic device. For example, the controller 180 may acquire zone information with regard to the current location of the electronic device and may select an external electronic device that is determined to be located in the same zone as the electronic device 100 as the first external electronic device based on the acquired zone information. For this purpose, the controller 180 may pre-register each zone in the electronic device 100.

Figure 15:
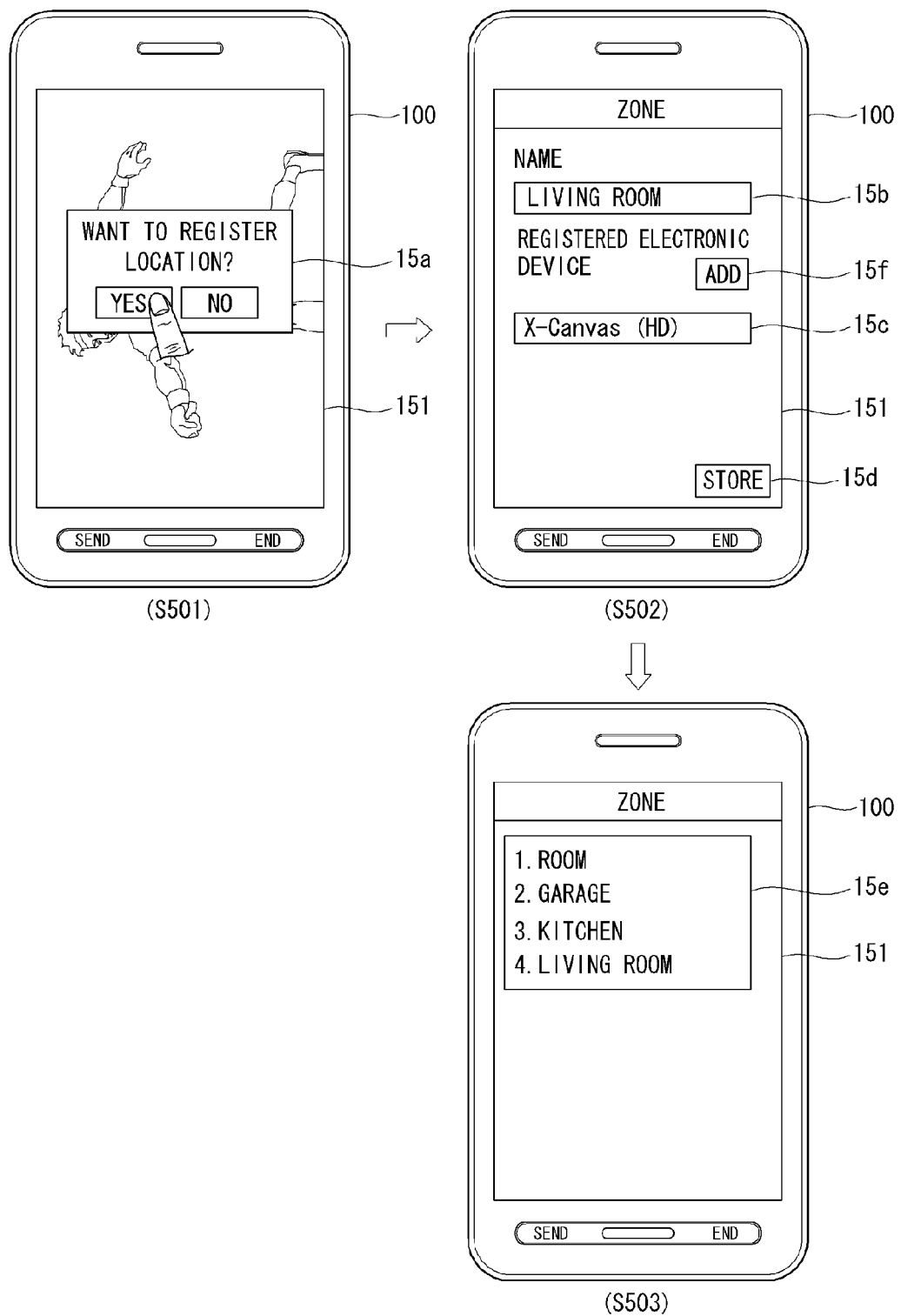
FIG. 15 is a screen view of an electronic device and illustrates registering a location and an associated external device with which content is to be shared in the electronic device providing the content according to an embodiment of the present invention.

Referring to FIG. 15, when location information is requested to be registered in the electronic device 100, the controller 180 displays a selection window 15a for selecting whether to perform location registration (S501). Upon receiving an input for selecting the location registration through the selection window 15a, a location/zone registration process is performed to register a zone or location within which the electronic device 100 is currently located. The zone may be defined by a preset distance from the current location of the electronic device 100. For example, when a new location is entered by the electronic device 100, the new location may be named, for example, as "Living Room," and a list 15c of electronic devices registered in the corresponding zone may be displayed (S502). When "Store" button 15d is pressed, the controller 180 registers the corresponding zone in the zone list 15e along with the entered zone information (S503). Thus, a number of different locations and corresponding external electronic devices may be registered in the electronic device 100.

Still referring to FIG. 15, when the electronic device 100 enters a registered zone, for example, "Living Room," an external electronic device registered to the registered zone may be selected as the first external electronic device to display the shared content in response to an input for selecting the registered zone. If registration of a new external electronic device to the registered zone is desired, an "Add" button 15f may be pressed, and the controller 180 searches for at least one external electronic device connectable via the communication unit 110. When one, for example, "X-Canvas (HD)," of the at least one searched external electronic device is selected, as shown in FIG. 15, the controller 180 registers the external electronic device, "X-Canvas (HD)" in association with the corresponding zone, "Living Room" and stores the updated registration information with regard to the zone "Living Room."

Figure 16:
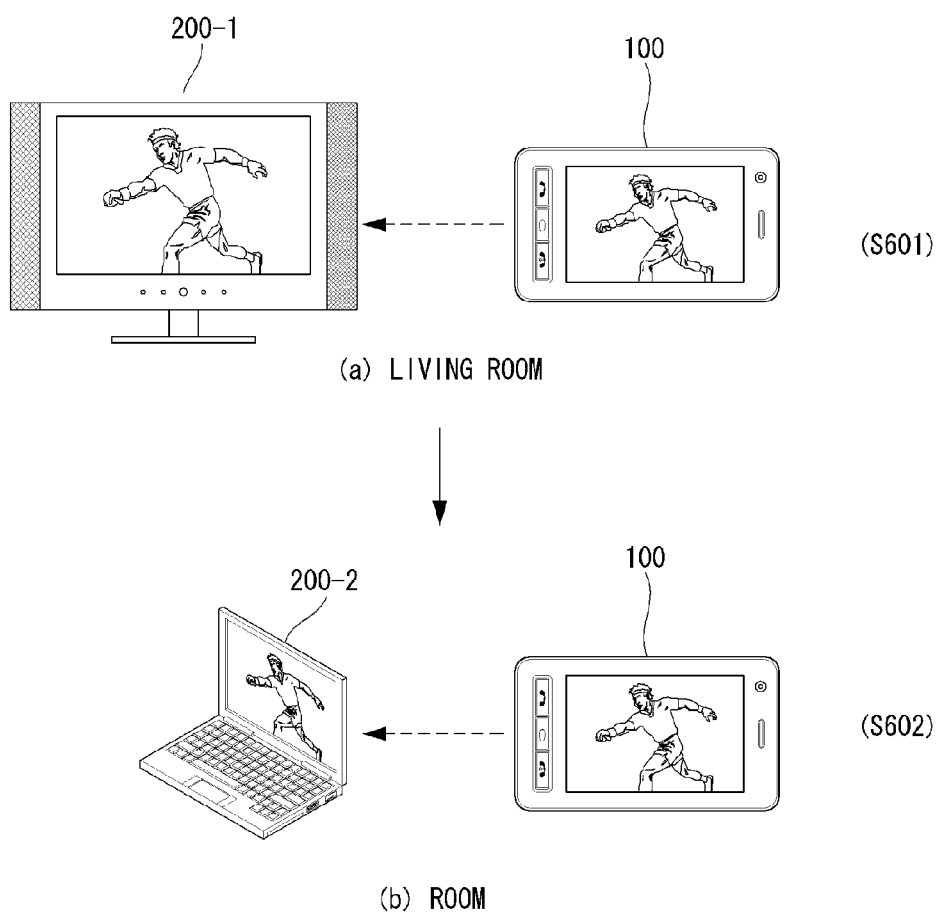
FIG. 16 illustrates transitioning from a first external device to a second external device to display content provided by an electronic device seamlessly based on a location and an associated external device registered in the electronic device according to an embodiment of the present invention.

FIG. 16 an example of switching from one external electronic device to another external electronic device to display the shared content as the electronic device 100 is moved from one location to another location. Referring to FIG. 16(a), the controller 180 displays the content through a television 200-1 when the electronic device 100 is located in a living room (S601). In this case, the television 200-1 may have been pre-registered with the location, living room. Thereafter, when the electronic device 100 is moved to a room, as shown in FIG. 16(b), the controller 180 searches for and detects an external electronic device registered to the room, for example, a laptop computer 200-2, and displays the content through the laptop computer 200-2 (S602).

According to the above described embodiment, an optimal external electronic device to display the shared content may be automatically searched for based on the user's location carrying the electronic device 100 or a user-oriented direction so that the content may be displayed through the searched external electronic device, thereby providing a user with an optimal service environment. Accordingly, even when the user carries the electronic device 100 to a different location, the content may be seamlessly provided through the optimal external electronic device registered in association with the location.

Figure 17:
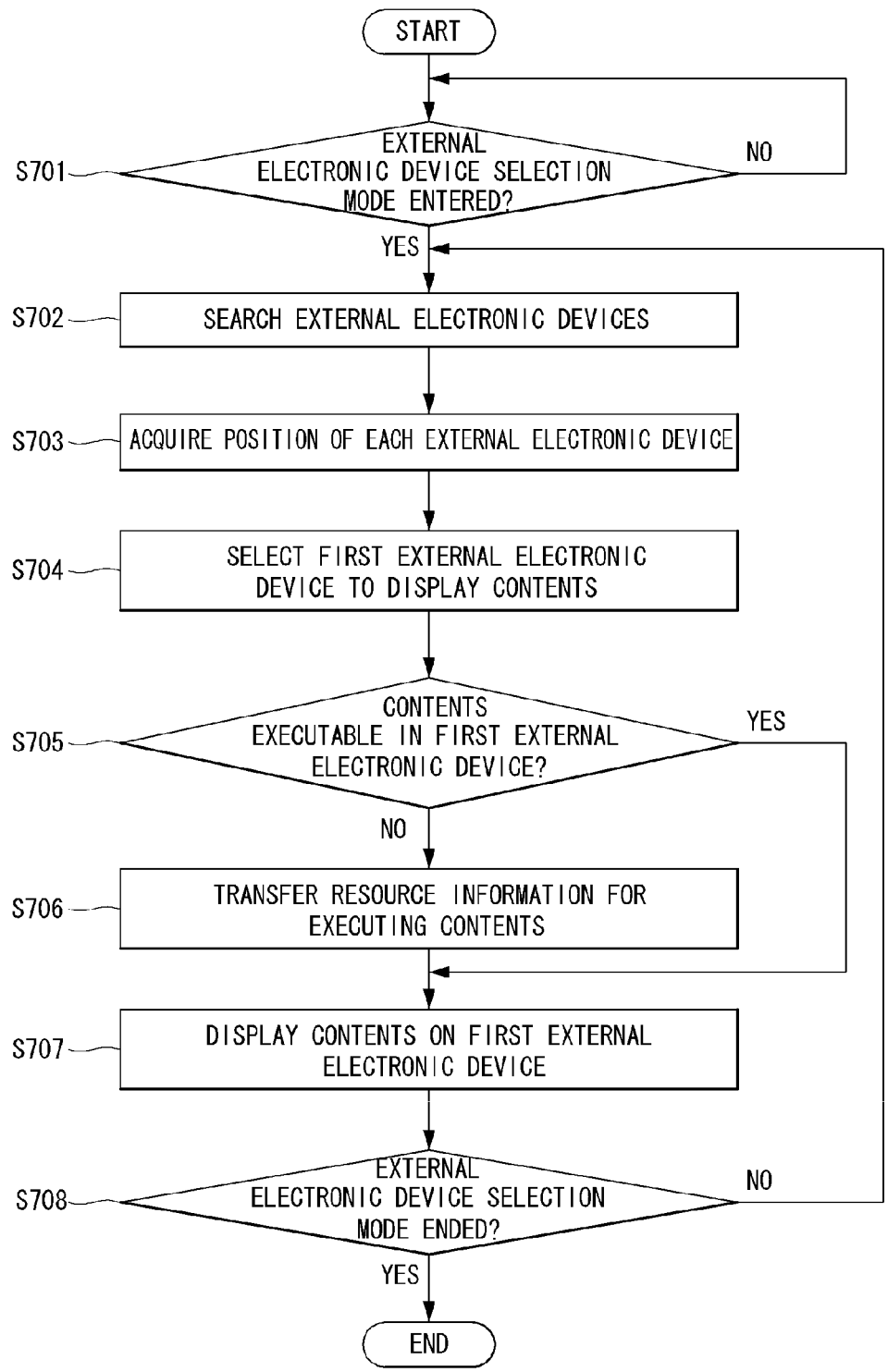
FIG. 17 is a flowchart illustrating a content sharing method in an electronic device according to still another embodiment of the present invention.
Figure 18:
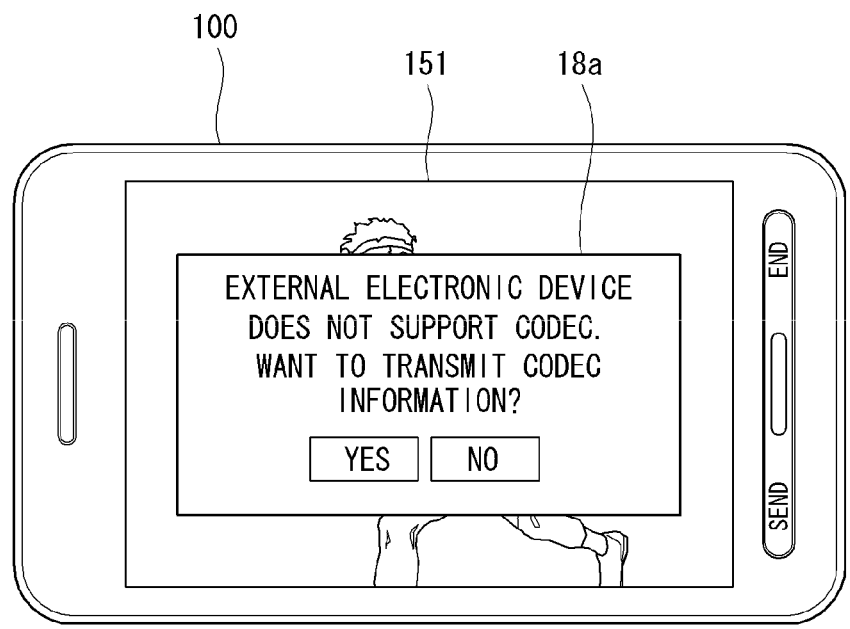
FIG. 18 is a screen view of an electronic device and illustrates prompting whether to transmit resource information required to display content provided by the electronic device to a selected external electronic device according to an embodiment of the present invention.

FIGS. 17 and 18 illustrate a content sharing method in an electronic device according to an embodiment of the present invention. In FIGS. 17, S701 and S704 are performed similar to S401 and S404 described above in connection with FIGS. 10-16, and thus, further detailed description thereof will be omitted.

Referring to FIG. 17, when the electronic device 100 enters a selection mode for selecting an external electronic device with which content is to be shared (S701), the controller 180 searches for at least one external electronic device that may be able to communicate with the electronic device 100 via the communication unit 110 (S702). Then, the controller 180 acquires location information of each of the searched external electronic devices (S703) and selects an external electronic device among the searched external electronic devices as a first external electronic device that is to display the content based on the acquired location information (S704).

Further, the controller 180 determines whether the selected first external electronic device is able to display the shared content (S705). When the first external electronic device is determined to have a capability to display the shared content, the controller 180 controls the first external electronic device to display the content (S707).

In contrast, when the selected first external electronic device is determined not to have a capability to display the shared content, the controller 180 identifies resources necessary to display the shared content at the first external electronic device. Further, the controller 180 transfers resource information including a website address from which the necessary resources may be downloaded to the first external electronic device (S706). Based on the resource information received from the electronic device 100, the first external electronic device may install the corresponding resources and subsequently display the shared content on the screen of the first external electronic device. According to an embodiment, when the resource information includes a website address from which the resources may be downloaded, the first external electronic device may include an application program that may download files linked to the website address and automatically execute the files.

As described above in connection with FIGS. 3 to 5, when external electronic devices are selected, the controller 180 may display the content through the selected external electronic devices automatically or only when the content is requested to be transferred to the selected external electronic devices. Moreover, as described above in connection with FIGS. 3-5, when the shared content is displayed on the selected external electronic devices (S707), the controller 180 may continue displaying the content on the display module 151 or stop displaying the content on the display module 151.

As described above, when the first external electronic device selected to display the shared content does not have resources necessary to display the content, the necessary resources may be automatically installed in the first external electronic device. However, the present invention is not limited thereto. Alternatively, when the first external electronic device does not have the resources necessary to display the content, the controller 180 may display this information on the screen of the display module 151, asking a user to determine whether to transfer the resource information to the first external electronic device. For example, referring to FIG. 18, when no codec that is necessary for executing the content is installed in the selected external electronic devices, the controller 180 displays a prompt window 18a on the screen, asking whether to transfer information related to installation of a corresponding codec to the selected external electronic devices. Accordingly, a user may determine whether to install the codec in the selected external electronic devices.

According to the above embodiment, an optimal external electronic device may be automatically searched based on the location of the electronic device 100 or user-oriented direction to display the shared content, thereby providing an optimal service environment to the user. Further, even when the user moves the electronic device 100 to other places, content may be seamlessly displayed on a series of external electronic devices. Further, when it is determined that the external electronic device determined to be optimal does not have the resources necessary for displaying the content, the corresponding resources may be automatically installed in the external electronic device, thus relieving the user's burden.

Figure 19:
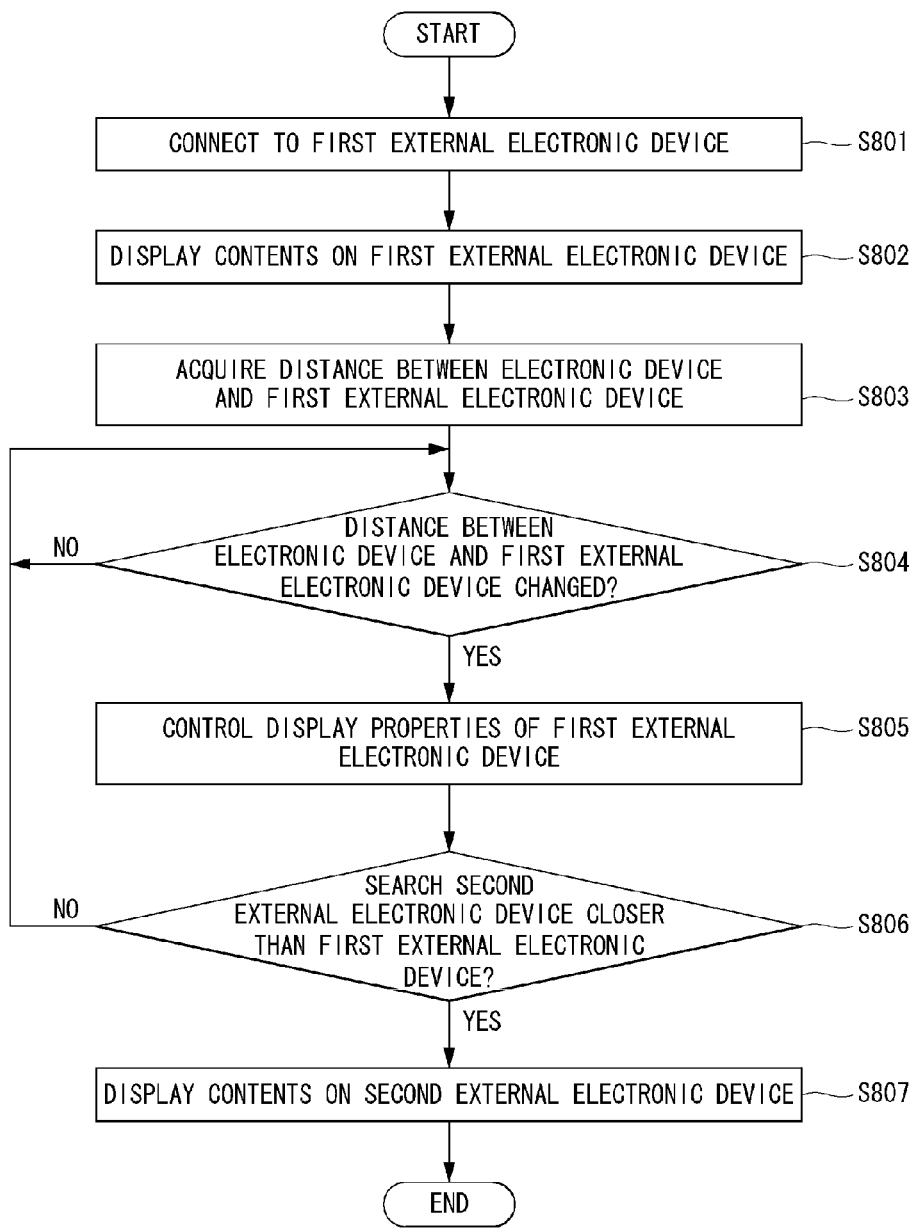
FIG. 19 is a flowchart illustrating a content sharing method in an electronic device according to still yet another embodiment of the present invention.

FIGS. 19-25 illustrate a content sharing method according to an embodiment of the present invention. Referring to FIG. 19, the controller 180 connects the electronic device 100 to the first external electronic device 200-1 via the communication unit 110 (S801).

Thereafter, when content to be shared is displayed through the first external electronic device 200-1 (S802), the controller 180 acquires a distance between the electronic device 100 and the first external electronic device 200-1 continuously or periodically (S803). According to an embodiment, while the shared content is displayed through the first external electronic device 200-1, the content may be concurrently displayed on the display module 151 of the electronic device 100.

When the distance between the electronic device 100 and the first external electronic device 200-1 is changed while the shared content is displayed (S804), the controller 180 changes display properties of the content displayed on the first external electronic device 200-1 (S805).

Figure 20:
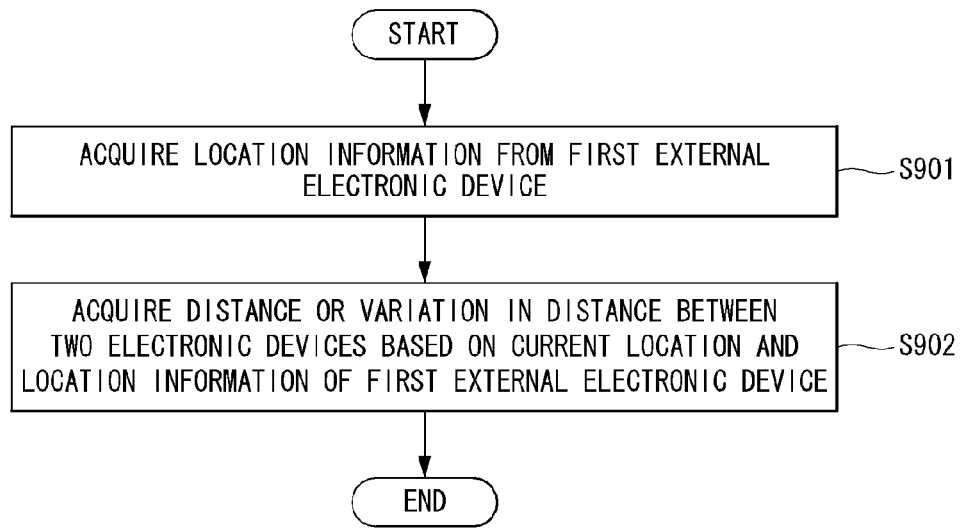
FIGS. 20 to 22 are flowcharts illustrating acquiring distance information between an electronic device providing content and an external electronic device with which the content is to be shared according to an embodiment of the present invention.
Figure 21:
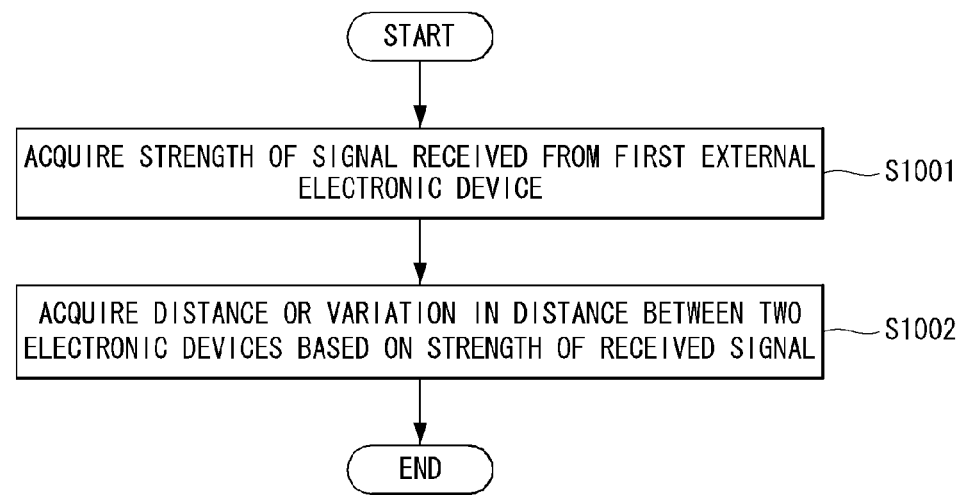
Figure 22:
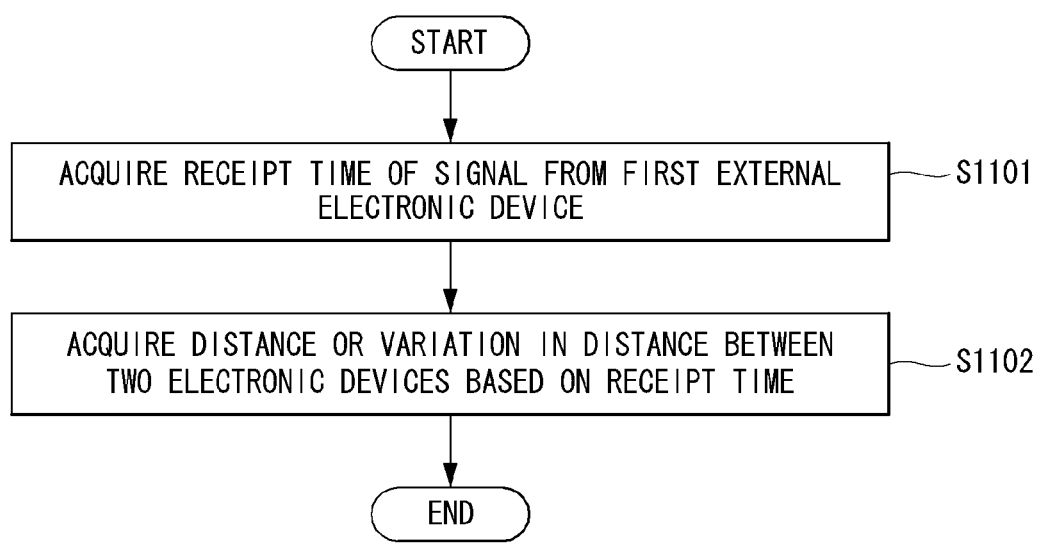

In S803, the controller 180 may acquire distance information between the electronic device 100 and the first external electronic device 200-1 by various methods. FIGS. 20-22 illustrate various examples of acquiring distance information between the electronic device 100 and each external electronic device.

For example, as shown in FIG. 20, the controller 180 acquires location information from the first external electronic device 200-1 (S901). The controller 180 acquires a distance between the electronic device 100 and the first external electronic device 200-1 and a distance variation based on the acquired location information and a current location of the electronic device 100 (S902).

For example, as shown in FIG. 21, the controller 180 analyzes a strength of a signal transmitted between the communication unit 110 and the first external electronic device 200-1 (S1001). The controller 180 acquires a distance between the electronic device 100 and the first external electronic device 200-1 and distance variation information based on the analyzed signal strength (S1002).

For example, as shown in FIG. 22, the controller 180 records time when the first external electronic device 200-1 receives a signal from the communication unit 110 (S1101). The controller 180 acquires a distance between the electronic device 100 and the first external electronic device 200-1 and distance variation information based on the recorded time (S1102).

Figure 23:
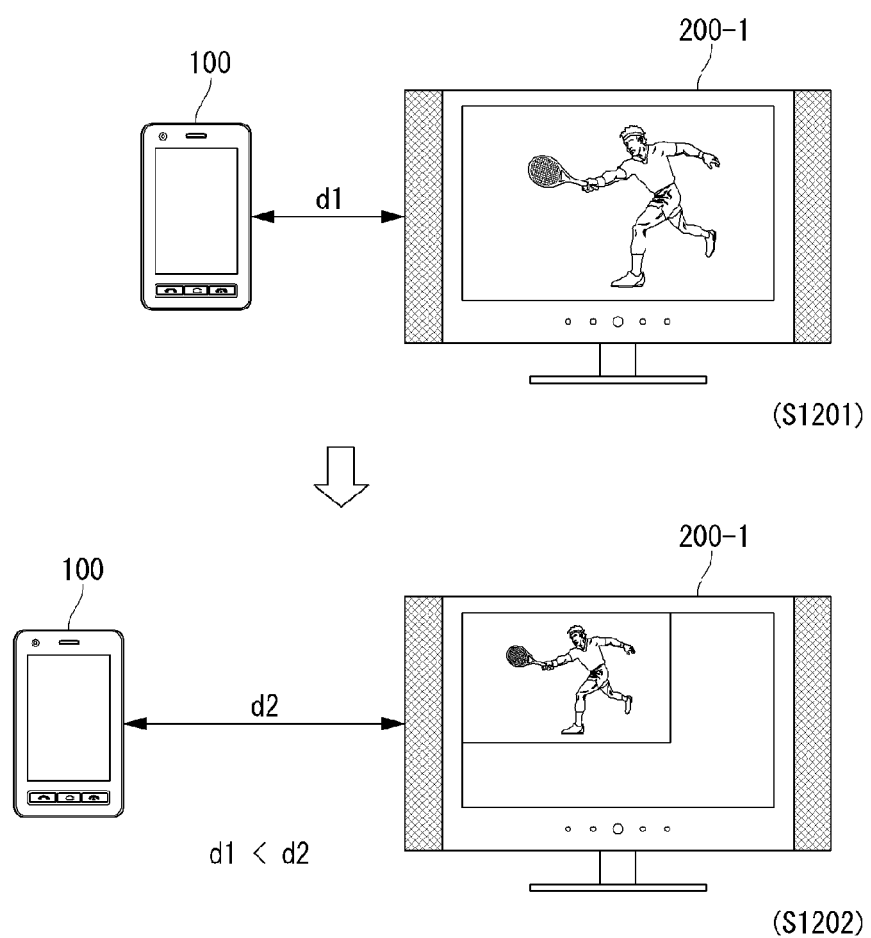
FIGS. 23 and 24 illustrate changing display properties of content displayed at an external device based on a change of a distance between an electronic device providing the content and the external device according to an embodiment of the present invention.
Figure 24:
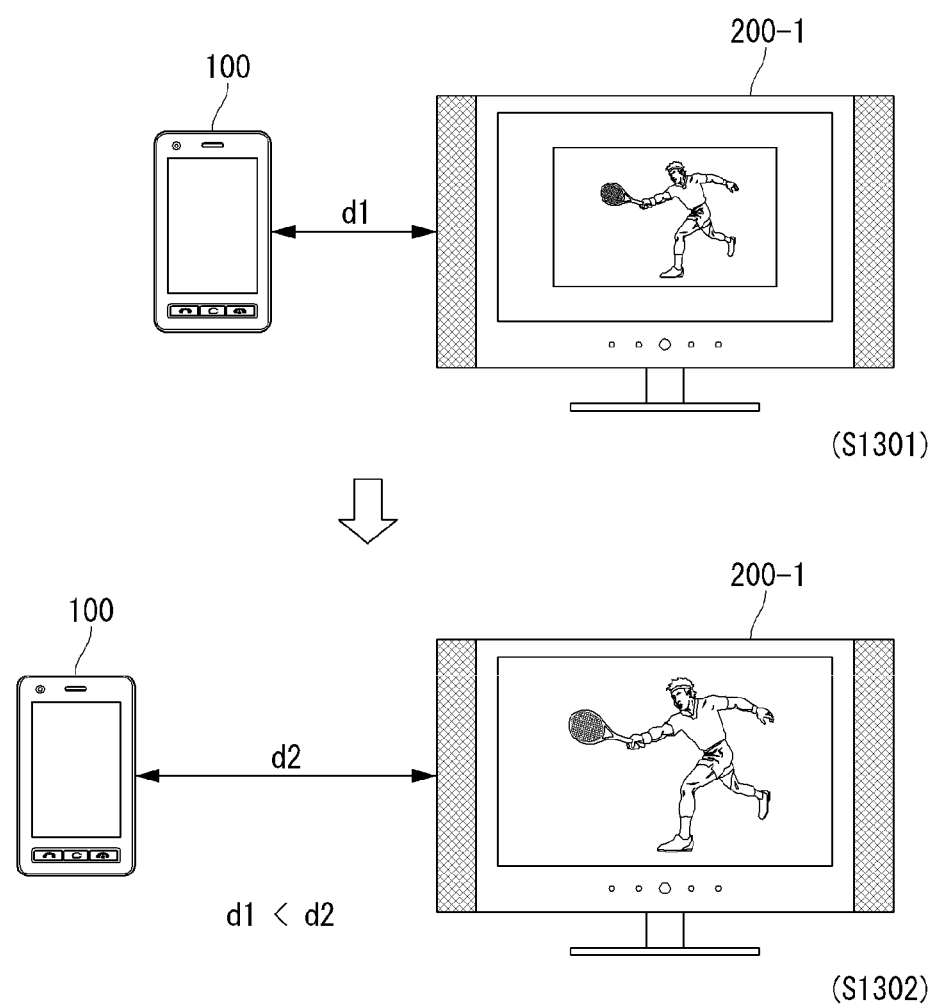

Referring back to FIG. 19, in S804, the controller 180 may change the display properties of the content displayed on the first external electronic device 200-1 by changing a size or a position of the content on a display screen of the first external electronic device 200-1. FIGS. 23 and 24 illustrate examples of changing the display properties of the content.

For example, as shown in FIG. 23, the controller 180 decreases the size of the content displayed on the first external electronic device 200-1 gradually as the distance between the electronic device 100 and the first external electronic device 200-1 increases from d1 to d2 (S1201 and S1202). When the electronic device 100 is a user's mobile terminal, the electronic device 100 moving away from the first external electronic device 200-1 means the user is moving away from the first external electronic device 200-1. This circumstance may mean that the user is losing an interest in the content displayed on the first external electronic device. Accordingly, the controller 180 may control the first external electronic device 200-1 such that as the user's interest is decreasing, the size of the displayed content is also reduced.

Alternatively, as shown in FIG. 24, the controller 180 may increase the size of the content displayed on the first external electronic device 200-1 gradually as the distance between the electronic device 100 and the first external electronic device 200-1 increases from d1 to d2 (S1301 and S1302). Further, as shown in FIG. 23, the controller 180 may change the position of the content displayed on the first external electronic device 200-1 as the distance between the electronic device 100 and the first external electronic device 200-1 increases from d1 to d2. Furthermore, referring to FIG. 23, the content displayed on the first external electronic device 200-1 (S1201) may fade out as the distance between the electronic device 100 and the first external electronic device 200-1 increases from d1 to d2, the size of the content displayed on the first external electronic device 200-1 being decreased (S1202). Alternatively, the size of the content displayed on the first external electronic device 200-1 may stay the same while the displayed content fades out as the distance between the electronic device 100 and the first external electronic device 200-1 increases (not shown in the drawing).

Turning back to FIG. 19, in S805, the controller 180 may directly control the display properties of the content displayed on the first external electronic device or transfer a control signal for controlling the display properties to the first external electronic device. For example, the controller 180 may control display properties of content displayed on the second external electronic device 200-2 by directly controlling display properties of the content transferred to the first external electronic device 200-1. That is, the controller 180 may control the display properties of the content displayed on the first external electronic device 200-1 by changing the display properties of the content and transferring the content with changed display properties to the first external electronic device 200-1. According to an embodiment, the display properties of content to be displayed on the first external electronic device 200-1 are changed by the controller 180, and then the content with changed display properties is transferred to the first external electronic device 200-1.

Further, the controller 180 may also control the display properties of the content displayed on the first external electronic device 200-1 by transmitting a control signal to the first external electronic device 200-1, the control signal controlling the display properties of the content. According to an embodiment, the content displayed on the first external electronic device 200-1 may be content that have been transferred from the electronic device 100 or other external electronic devices or content previously stored in the first external electronic device 200-1.

Returning to FIG. 19, as the distance between the electronic device 100 and the first external electronic device 200-1 increases, the controller 180 searches a second external electronic device 200-2 that is located closer than the first external electronic device 200-1 from the electronic device 100 (S806). According to an embodiment, the electronic device 100 may search the second external electronic device 200-2 according to methods described in connection with FIGS. 20-22.

For example, the controller 180 may compare the strength of a signal received from the first external electronic device 200-1 with the strength of a signal received from the second external electronic device 200-2 to determine which external electronic device is located closer to the electronic device 100. According to an embodiment, the controller 180 may compare time of receiving a signal from the first external electronic device 200-1 with time of receiving a signal from the second external electronic device 200-2 and may determine an external electronic device whose signal is received earlier as being closer to the electronic device 100.

When the second external electronic device 200-2, which is located closer to the electronic device 100 than the first external electronic device 200-1, is searched, the controller 180 controls the external electronic devices 200-1 and 200-2 such that the content displayed on the first external electronic device 200-1 is displayed on the second external electronic device 200-2 (S807). For example, the controller 180 may transfer the content displayed on the first external electronic device 200-1 to the second external electronic device 200-2 or may control the first external electronic device 200-1 so that the content is transferred from the first external electronic device 200-1 to the second external electronic device 200-2.

Figure 25:
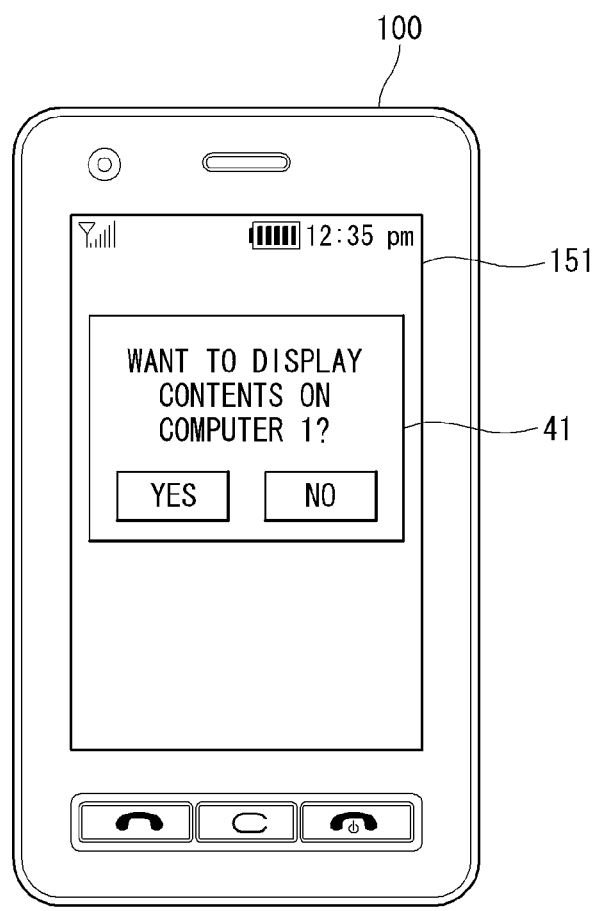
FIG. 25 is a screen view of an electronic device and illustrates prompting whether to display content of the electronic device at a detected specific external device according to an embodiment of the present invention.

Although it has been described in FIG. 19 that when the second external electronic device 200-2 that is located closer than the first external electronic device 200-1 from the electronic device 100 is searched, the content is automatically displayed on the second external electronic device 200-2, the present invention is not limited thereto. According to an embodiment, when the second external electronic device 200-2 that is located closer than the first external electronic device 200-1 from the electronic device 100 is searched, the content may be displayed on the second external electronic device 200-2 only when the content is requested to be displayed on the second external electronic device 200-2 via the user input unit 130. Referring to FIG. 25, the controller 180 displays a selection window 41 through the display module 151 so that a user may determine whether to display content through the second external electronic device 200-2 that is located closer than the first external electronic device 200-1 from the electronic device 100, for example, "computer 1." Accordingly, the user may enter an input through the user input unit 130 to display the content on the second external electronic device 200-2.

Figure 26:
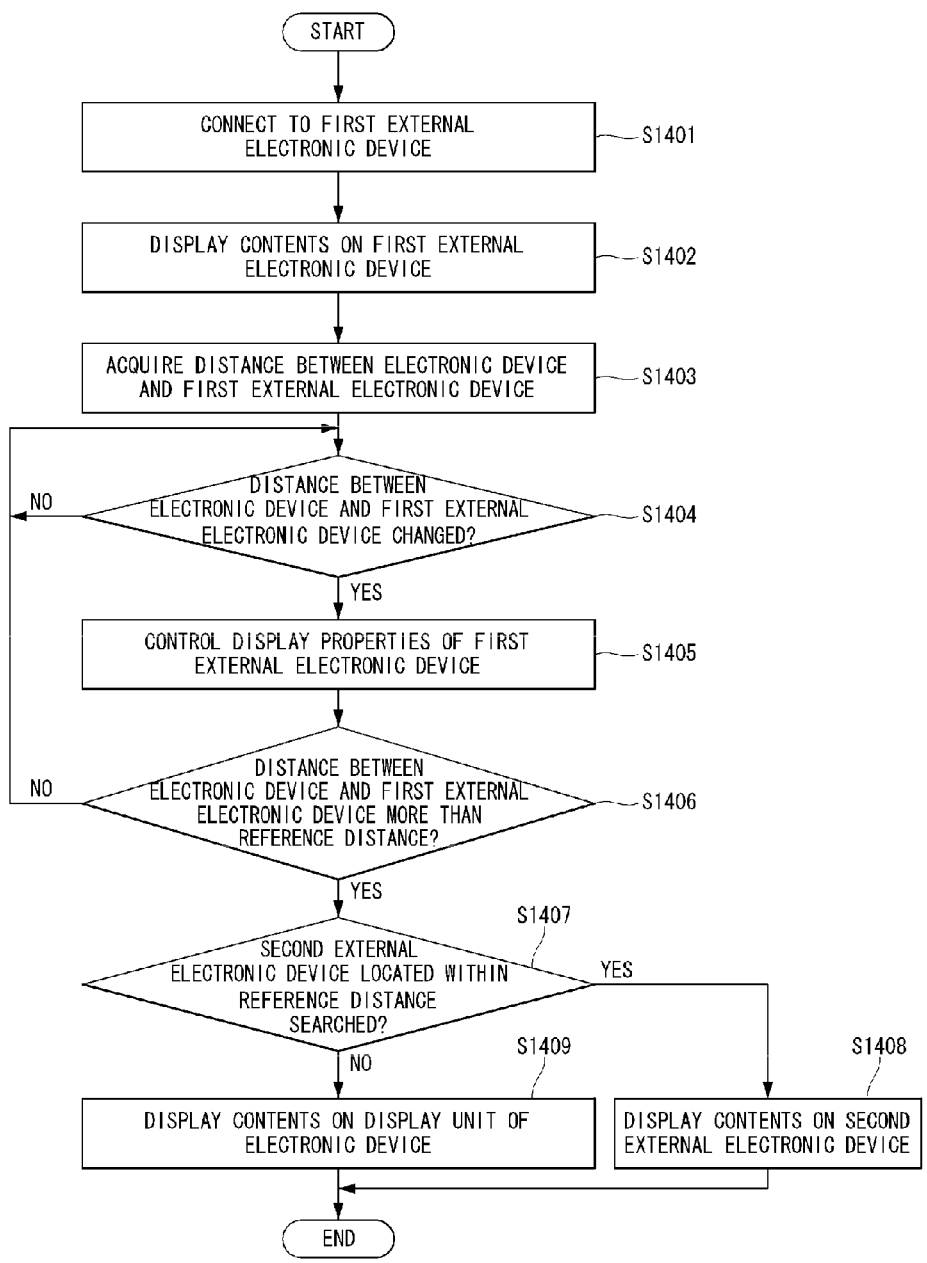
FIG. 26 is a flowchart illustrating a content sharing method in an electronic device according to still yet another embodiment of the present invention.
Figure 27:
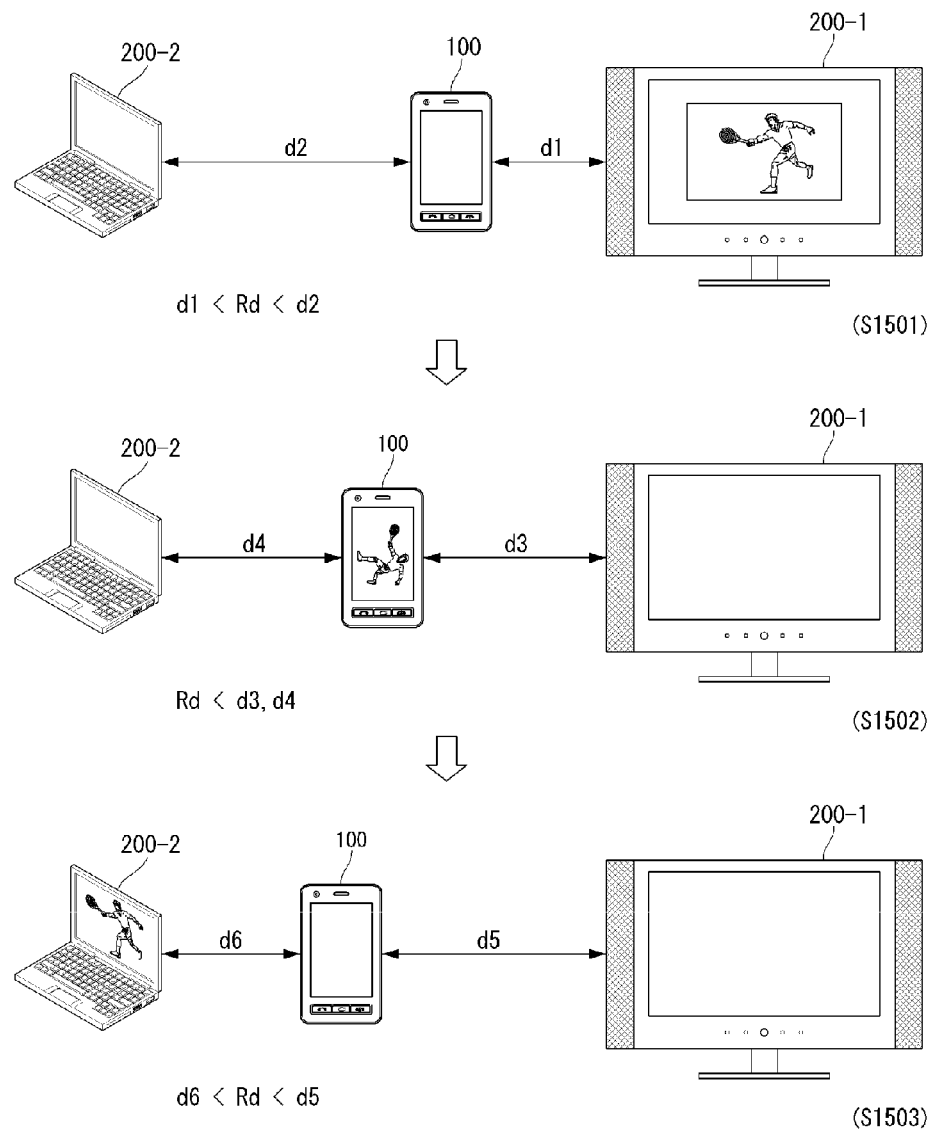
FIG. 27 illustrates determining a device to display shared content based on a distance between an electronic device providing the content and at least one external device to provide seamless display of the content according to an embodiment of the present invention.

FIGS. 26 and 27 illustrate a content sharing method in an electronic device according to an embodiment of the present invention. In FIGS. 26, S1401 and S1405 are identical or substantially similar to S101 to S105 described above in connection with FIG. 19, and thus, further detailed descriptions thereof will be omitted.

Referring to FIG. 26, when a distance between the electronic device 100 and the first external electronic device 200-1 changes while content to be shared is displayed on the first external electronic device 200-1, the controller 180 determines whether the distance between the electronic device 100 and the first external electronic device 200-1 is greater than a reference distance (S1406).

When the distance is determined to be greater than the reference distance, the controller 180 may search for another external electronic device that is located within the reference distance with respect to the electronic device 100. The controller 180 may detect a second external electronic device 200-2 that is located within the reference distance with respect to the electronic device 100 (S1407). According to an embodiment, the controller 180 may perform such search by the methods described above in connection with FIGS. 20-22.

When the second external electronic device 200-2 that is located within the reference distance with respect to the electronic device 100 is searched, the controller 180 controls the second external electronic device 200-2 so that the second external electronic device 200-2 displays the shared content (S1408). Further, the controller 180 controls the first external electronic device 200-1 so that the first external electronic device 200-1 does not display the shared content any more.

When the second external electronic device 200-2 that is located within the reference distance with respect to the electronic device 100 is not searched, the controller 180 displays the shared content that was displayed on the first external electronic device 200-1 through the display unit 151 of the electronic device 100 until the second external electronic device 200-2 is searched (S1409). Further, the controller 180 controls the first external electronic device 200-1 so that the first external electronic device does not display the shared contents any more.

Although it has been described in FIG. 26 that when the second external electronic device 200-2 that is located within the reference distance is searched, the shared content is automatically displayed on the second external electronic device 200-2, the present invention is not limited thereto. According to an embodiment, as shown in FIG. 25, when the second external electronic device 200-2 that is located within the reference distance with respect to the electronic device 100 is searched, the shared content may also be displayed through the second external electronic device 200-2 only when an input is received via the user input unit 130, the input requesting the content to be displayed on the second external electronic device 200-2.

FIG. 27 illustrates an example of sharing content based on a distance between an electronic device 100 and external electronic devices according to an embodiment of the present invention. Referring to FIG. 27, when a distance d1 between the electronic device 100 and the first external electronic device 200-1 is less than a reference distance Rd, the controller 180 displays the shared content on the first external electronic device 200-1 (S1501). When the distance d1 increases and becomes greater than the reference distance Rd, the controller 180 searches for another external electronic device that may be located within the reference distance Rd with respect to the electronic device 100. When no external electronic device is searched within the reference distance Rd, the controller 180 displays the content on the display module 151 of the electronic device 100 (S1502). According to an embodiment, the controller 180 may control the first external electronic device 200-1 so that the first external electronic device 200-1 does not display the content any more when the distance d1 is greater than the reference distance Rd.

When the electronic device 100 moves and the second external electronic device 200-2 that is located within the reference distance Rd with respect to the electronic device 100 is searched, the controller 180 controls the second external electronic device 200-2 so that the content displayed on the display module 151 of the electronic device 100 is displayed on the second external electronic device 200-2 (S1503).

Although the embodiment has been described that when the distance between the electronic device 100 and the first external electronic device 200-1 displaying the content is increased and no external electronic device is present within the reference distance with respect to the electronic device 100, the content displayed on the first external electronic device 100 is displayed on the display module 151 of the electronic device 100, the present invention is not limited thereto. For example, according to an embodiment, when the distance between the electronic device 100 and the first external electronic device 200-1 displaying the content becomes greater than the reference distance Rd, the content may not be displayed on any electronic device until an external electronic device that is located within the reference distance with respect to the electronic device 100 is searched.

Figure 28:
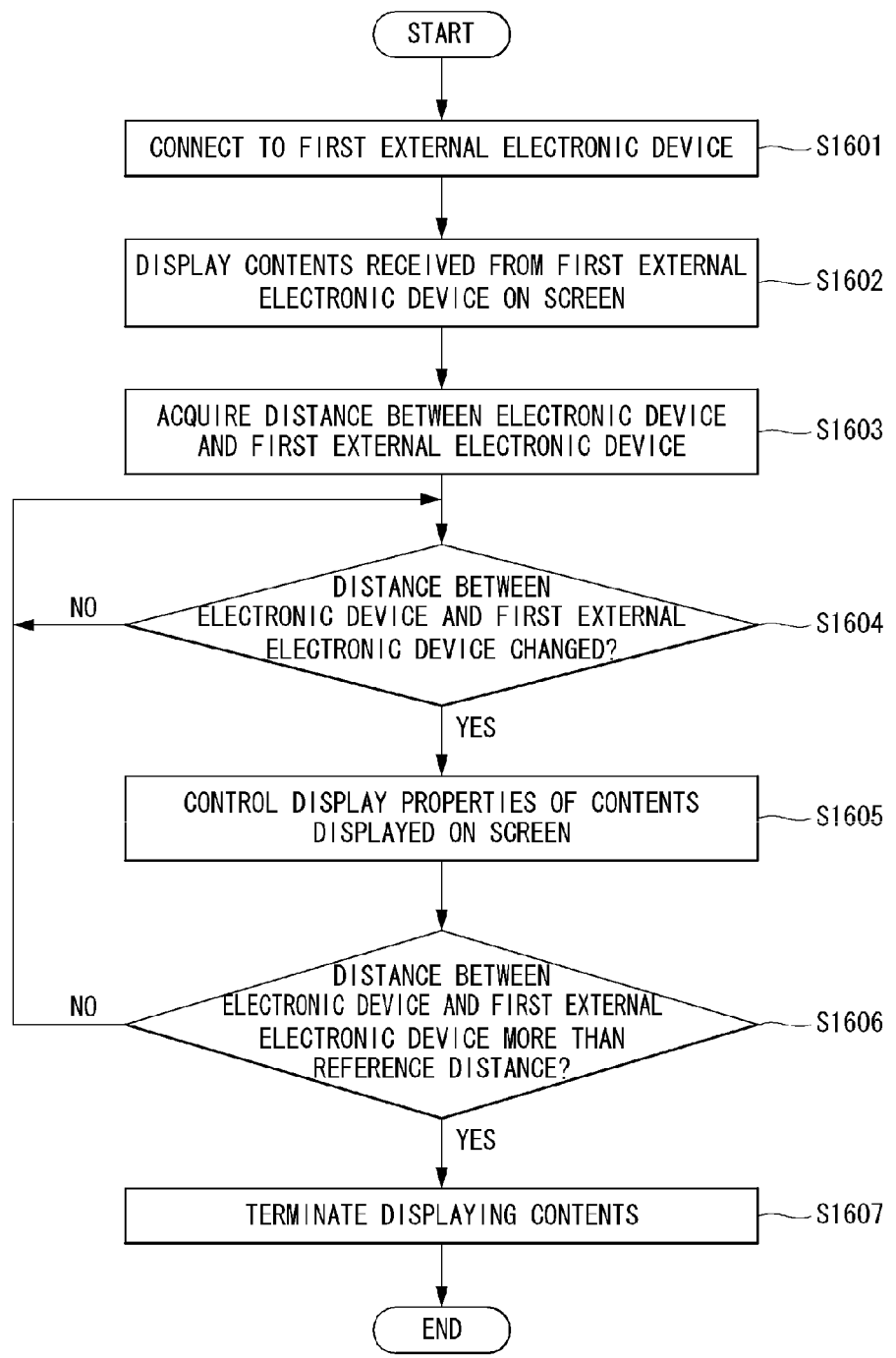
FIG. 28 is a flowchart illustrating a content sharing method in an electronic device according to still yet another embodiment of the present invention.
Figure 29:
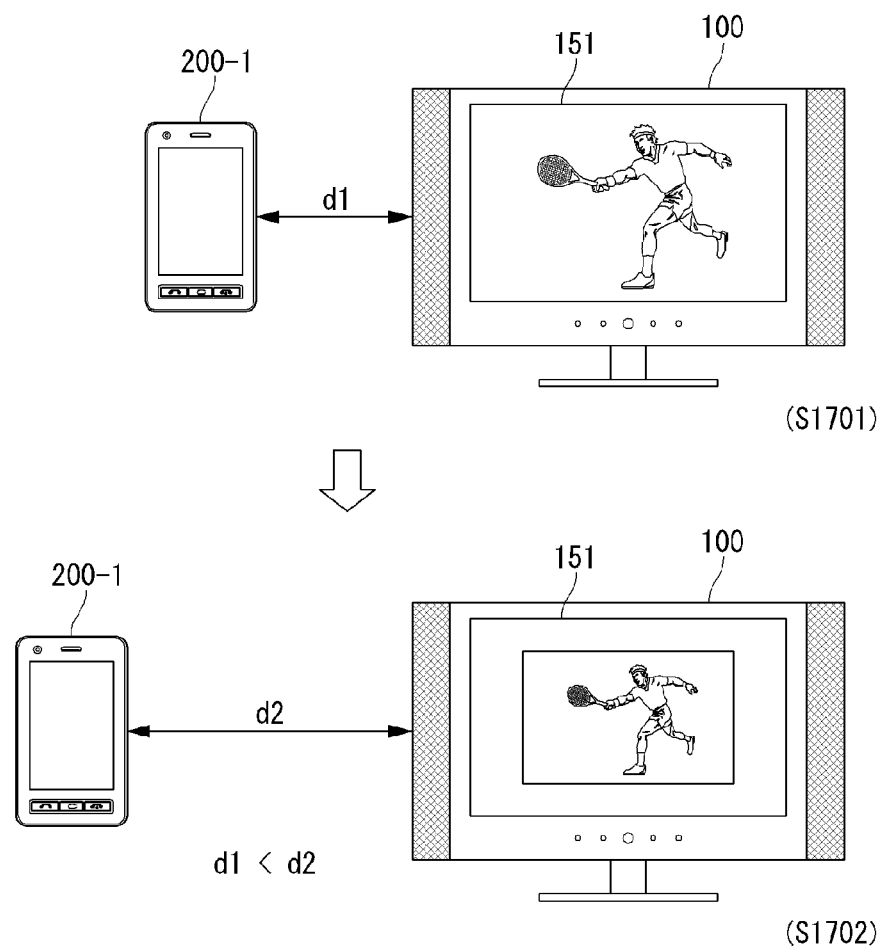
FIG. 29 illustrates sharing content between an electronic device and an external device and changing display properties of the content based on a distance between the electronic device and the external electronic device according to an embodiment of the present invention.

FIGS. 28 and 29 illustrate a content sharing method in an electronic device according to an embodiment of the present invention. Referring to FIG. 28, the controller 180 connects to the first external electronic device 200-1 via the communication unit 110 (S1601). The controller 180 receives content to be shared from the first external electronic device 200-1 and controls the display module 151 to display the received content on its screen (S1602).

Further, the controller 180 monitors a distance between the electronic device 100 and the first external electronic device 200-1 continuously or periodically (S1603). According to an embodiment, the controller 180 may measure the distance between the electronic device 100 and the first external electronic device 200-1 by the methods described with reference to FIGS. 20 to 22.

When the distance between the electronic device 100 and the first external electronic device 200-1 changes while the content is displayed on the display module 151 of the electronic device 100 (S1604), the controller 180 changes display properties of the content displayed on the screen of the display module 151 (S1605). For example, the controller 180 may change the size or position of the content displayed on the screen, similar to the embodiments as shown in FIGS. 23 and 24.

When the distance between the electronic device 100 and the first external electronic device 200-1 is greater than a reference distance (S1606), the controller 180 controls the display module 151 to stop displaying the content (S1607).

FIG. 29 illustrates an example of sharing content based on a distance between the electronic device 100 and external electronic devices according to an embodiment of the present invention. Referring to FIG. 29, as the distance between the electronic device 100 and the first external electronic device 200-1 increases from d1 to d2, the controller 180 controls the display module 151 so that the size of the content displayed on the screen of the display module 151 is gradually reduced (S1701 and S1702).

According to the above described embodiments of the present invention, the electronic device 100 alters the size or position of content displayed on the external electronic device based on the distance between the electronic device 100 and the external electronic device when sharing the content with the external electronic device. This may provide a visual effect with regard to the content displayed on the external electronic device based on the user's movement.

According to the embodiments of the present invention, an electronic device for displaying content may be automatically changed in real time according to the user's moving path. Therefore, a user may enjoy seamless displaying of content even during the movement.

The above-described method of sharing content in an electronic device may be written as computer programs and may be implemented in digital microprocessors that execute the programs using a computer readable recording medium. The method of sharing content in the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device comprising:
a wireless communication unit configured to wirelessly communicate with any of a plurality of external devices;
a display configured to display content including specific content;
an input unit configured to receive an input for selecting the specific content; and
a controller configured to:
search the plurality of external devices for a group of available external devices comprising at least one external device that is available for communication with the electronic device,
receive content specification information from each external device of the group of available external devices to determine each external device's capability to display the specific content,
cause the wireless communication unit to establish communication with a selected first external device of the group of available external devices,
cause displaying of the specific content on a display of the selected first external device upon determining that the selected first external device is capable of displaying the specific content based on the received content specification information,
cause the wireless transmission unit to transmit the specific content to a selected second external device to display the specific content on a display of the selected second external device in response to a first input upon determining that the selected second external device is capable of displaying the specific content based on the received content specification information,
cause simultaneous displaying of a first portion of the specific content on the display of the selected first external device and a second portion of the specific content on the display of the selected second external device in response to the first input, and
cause simultaneously a display size of the first portion to be decreased and a display size of the second portion to be increased until an entire portion of the specific content is displayed on the display of the selected second external device only.

2. The electronic device of claim 1, wherein the controller is further configured to select the selected first external device based on a relative distance between the electronic device and each of the group of available external devices if the group of available external devices comprises more than one external device, wherein the selected first external device is located closest to the electronic device among the group of available external devices.

3. The electronic device of claim 1, wherein the controller is further configured to cause the display to display a list of the external devices of the group of available external devices if the group of available external devices comprises more than one external device, such that at least one external device is selectable from the list to display the specific content.

4. The electronic device of claim 3, wherein:
the controller is further configured to select only external devices that have a capability to display the specific content from the group of available of external devices,
the list includes only external devices that are capable of displaying the specific content, and
the external devices included in the list are arranged in an order of their corresponding distances from the electronic device.

5. The electronic device of claim 3, wherein:
the external devices included in the list are arranged in an order of their corresponding distances from the electronic device, and
the list indicates whether each external device included in the list is capable of displaying the specific content.

6. The electronic device of claim 5, wherein the controller is further configured to cause the wireless transmission unit to transmit resource information to a selected external device of the group of available external devices if the selected external device does not have the capability to display the specific content due to a lack of a resource, wherein the resource information provides information necessary for the selected external device to acquire the resource to display the specific content.

7. The electronic device of claim 1, wherein the controller is further configured to obtain position information for each of the group of available external devices and to select the selected first external device in response to an input comprising a user-oriented direction.

8. The electronic device of claim 7 further comprising a camera, wherein:
the controller is further configured to detect the user-oriented direction by performing image recognition on an image captured by the camera, and
the input comprises a captured image of the selected first external device.

9. The electronic device of claim 7 further comprising a sensing unit configured to detect an azimuth of a direction of orientation of the electronic device, wherein the input comprises pointing the sensing unit toward the selected first external device.

10. The electronic device of claim 1, wherein the first input comprises:
pointing a specific portion of the electronic device substantially toward a first direction corresponding to a position of the selected first external device; and
moving the electronic device such that the specific portion is pointed substantially toward a second direction corresponding to a position of the selected second external device.

11. The electronic device of claim 7 further comprising a touch screen configured to receive touch inputs, wherein:
the controller is further configured to recognize the user-oriented direction based on a direction of a drag input received via the touch screen, and
the drag input is received in a direction substantially toward a direction corresponding to a position of the selected first external device.

12. The electronic device of claim 11, wherein:
the controller is further configured to cause the display to display a rotatable control icon on the touch screen, and
the input comprises a rotation of the control icon according to the drag input to point the control icon substantially toward a direction corresponding to a position of the selected first external device.

13. The electronic device of claim 11, wherein the controller is further configured to:
cause the display to display a rotatable control icon on the touch screen, wherein the control icon is rotated according to the drag input;
cause the display to display a plurality of icons each corresponding to an external device of the group of available external devices, the plurality of icons arranged around the control icon based on a relative position of each of the group of available external devices with respect to the electronic device; and
select an external device to display the specific content, the selected external device corresponding to an icon of the plurality of icons towards which the control icon is pointed.

14. The electronic device of claim 1 further comprising a memory unit configured to store information, wherein the controller is further configured to:
register the selected first external device and the first specific location of the selected first external device,
cause the memory unit to store the registered selected first external device and the corresponding first specific location, and
cause the display to display the specific content on the registered selected first external device when the electronic device is positioned at the first specific location.

15. The electronic device of claim 14, wherein the controller is further configured to cause a display of the selected second external device to display the specific content when the electronic device is moved from the registered first specific location to a registered second specific location, the selected second external device located at the registered second specific location and registered in association with the second specific location.

16. The electronic device of claim 1, wherein the input unit is further configured to receive an input for searching for an external device to display the specific content, wherein the controller searches for the external device in response to the input.

17. The electronic device of claim 16, wherein:
the input for searching comprises a drag input received via a touch screen of the electronic device while the display displays the specific content, and
the controller is further configured to move the displayed specific content in response to the drag input to indicate that the specific content is being transferred to the selected first external device to be displayed on the display of the selected first external device.

18. The electronic device of claim 1, wherein the controller is further configured to:
cause displaying of the specific content on the display of the selected first external device only when the selected first external device allows displaying of the specific content on the display of the selected first external device, and
output an alert via at least the display if the selected first external device does not allow displaying of the specific content.

19. The electronic device of claim 1 further comprising a memory unit configured to store the specific content, wherein the controller is further configured to:
retrieve the specific content from the memory unit to be displayed on the display of the selected first external device;
output an alert that the selected first external device is not capable of displaying the specific content due to a lack of a resource required to display the specific content; and
output a prompt whether to transmit resource information to the selected first external device, wherein the resource information provides information necessary for the selected first external device to acquire the resource, and
cause the display of the selected first external device to display the specific content after the resource is acquired by the selected first external device.

20. The electronic device of claim 1, wherein the controller is further configured to cause the wireless communication unit to transfer the specific content from an external storage device to the selected first external device if the specific content is stored in the external storage device and cause the display of the selected first external device to display the specific content.

21. The electronic device of claim 1, wherein the content specification information includes at least a resolution, a codec, or a content playback program that is supported by the first external device.

22. The electronic device of claim 1, wherein the controller is further configured to:
    determine a first distance between the electronic device and the selected first external device displaying the specific content; and
    control a display property of the specific content displayed on the display of the selected first external device upon determining that the first distance has changed.

23. The electronic device of claim 22, wherein the display property includes a display size and the controller is further configured to cause the display size of the specific content displayed on the display of the selected first external device to be increased or decreased according to the change of the first distance upon determining that the first distance is greater than a preset value of a reference distance.

24. The electronic device of claim 22, wherein the controller is further configured to:
    cause displaying of the specific content on the display of the selected second external device when the first distance is greater than a preset value of a reference distance and a second distance between the electronic device and the selected second external device is equal to or less than the preset value of the reference distance, and
    cause the display of the selected first external device to no longer display the specific content after the specific content is caused to be displayed on the display of the selected second external device.

25. The electronic device of claim 24, wherein the controller is further configured to cause the display to display the specific content when both the first and second distances are greater than the preset value of the reference distance and no external device is present within the reference distance from the electronic device.

26. The electronic device of claim, 24, wherein the controller is further configured to output a prompt whether to select the selected second external device to display the specific content on the display of the selected second external device.

27. The electronic device of claim 1, wherein the controller is further configured to:
    cause the display to continue displaying the specific content while the specific content is displayed on the display of the selected first external device; and
    cause the display to stop displaying the specific content in response to an input received while the specific content is displayed on the display of the selected first external device.

28. A method of sharing content between an electronic device and an external device, the method comprising:
    selecting specific content to be displayed on a display of the external device or displaying the specific content on a display of the electronic device;
    searching for a group of available external devices comprising at least one external device that is capable of communicating with the electronic device;
    receiving content specification information from each external device of the group of available external devices to determine each external device's capability to display the specific content;
    establishing wireless communication between the electronic device and a selected first external device of the group of available external devices
    determining that the selected first external device is capable of displaying the specific content based on the received content specification information;
    causing displaying of the specific content on a display of the selected first external device;
    determining that a selected second external device is capable of displaying the specific information based on the received content specification information;
    transmitting the specific content to the selected second external device to be displayed on a display of the selected second external device in response to an input;
    causing simultaneous displaying of a first portion of the specific content on the display of the first external device and a second portion of the specific content on the display of the second external device in response to the input; and
    simultaneously causing a decrease of a display size of the first portion and an increase of a size of the second portion until an entire portion of the specific content including the first portion and the second portion is displayed on the display of the selected second external device.

29. A method of sharing content between an electronic device and an external device, the method comprising:
    selecting specific content to be displayed on a display of the external device or displaying the specific content on a display of the electronic device;
    searching for a group of available external devices comprising at least one external device that is capable of communicating with the electronic device;
    receiving content specification information from each external device of the group of available external devices to determine each external device's capability to display the specific content;
    determining a relative distance between the electronic device and each electronic device of the group of available external devices when the group of available external devices comprises at least two external devices;
    selecting a first external device of the group of available external devices that is positioned closest to the electronic device based on the corresponding determined relative distance of the first external device;
    causing displaying of the specific content on the selected first external device,
    changing a display property of the displayed specific content according to a change in the determined relative distance between the electronic device and the selected first external device when the distance is greater than a preset value of a reference distance;
    displaying a list of the external devices of the group of available external devices, each external device represented by an icon of a plurality of icons arranged in an order of a corresponding determined relative distance of each external device;

displaying the corresponding received content specification information of each external device, the corresponding determined relative distance of each external device, or a control icon for selecting the corresponding external device with each displayed icon;

selecting one external device of the group of available external devices in response to an input for selecting an icon corresponding to the selected external device selecting a second external device of the group of available external devices to display the specific content, wherein the second external device is selected:
- in response to an input comprising a user-oriented direction generated by pointing a specific portion of the electronic device substantially toward a direction of the location of the second external device; or
- in response to the electronic device being positioned in proximity to a specific location, wherein the second external device is registered in the electronic device to be associated with the specific location to cause displaying of the specific content.

30. The method of claim 29, wherein selecting the second external device in response to the electronic device being positioned in proximity to the specific location further comprises:

determining a first distance between the electronic device and the selected first external device periodically at preset intervals;

searching for the second external device while the specific content is displayed on the selected first external device;

causing changing of a display property of the specific content displayed on the selected first external device upon determining that the first distance is greater than a preset value of a first reference distance;

causing displaying of the specific content on a display of the second external device upon determining that a second distance between the electronic device and the second external device is less than the first distance, or upon determining that the first distance is greater than the preset value of the first reference distance and the second distance is less than the preset value of the first reference distance; and displaying the specific content on the display of the electronic device when the first and second distances are greater than a preset vale of a second reference distance that is greater than the preset value of the first reference distance, and no other external device is present within the first or second reference distances, and concurrently displaying the specific content on the display of the electronic device while causing the specific content to be displayed on the display of the selected first external device or the second external device until:
- an input is received for stopping the display of the specific content on the display of the electronic device is received, or
- the specific content is no longer displayed on the display of the electronic device while the specific content is still caused to be displayed on the selected first external device or the second external device.

* * * * *